United States Patent
Dudar

(10) Patent No.: US 10,954,874 B2
(45) Date of Patent: Mar. 23, 2021

(54) SYSTEM AND METHOD FOR DIAGNOSING A VARIABLE DISPLACEMENT ENGINE

(71) Applicant: Ford Global Technologies, LLC, Dearborn, MI (US)

(72) Inventor: Aed M. Dudar, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 636 days.

(21) Appl. No.: 15/893,435

(22) Filed: Feb. 9, 2018

(65) Prior Publication Data

US 2019/0249618 A1 Aug. 15, 2019

(51) Int. Cl.
*F02D 41/22* (2006.01)
*F01L 13/00* (2006.01)
(Continued)

(52) U.S. Cl.
CPC ........ *F02D 41/221* (2013.01); *F01L 13/0005* (2013.01); *F02B 39/10* (2013.01); *F02D 41/18* (2013.01); *F02M 35/1038* (2013.01); *F02M 35/10386* (2013.01); *F01L 2001/0537* (2013.01); *F01L 2013/001* (2013.01); *F01L 2013/0052* (2013.01); *F01L 2013/101* (2013.01); *F01L 2013/105* (2013.01); *F01L 2800/11* (2013.01); *F01L 2820/041* (2013.01); *F02D 41/123* (2013.01);
(Continued)

(58) Field of Classification Search
CPC ...... F02D 41/18; F02D 41/123; F02D 41/221; F02D 2200/0402; F02D 2200/0406; F02D 2250/06; F02D 13/06; F01L 13/0005; F01L 2001/0537; F01L 2820/041; F01L 2013/001; F01L 2013/101; F01L 2013/105; F01L 2013/0052; F01L 2800/11; F02M 35/1038; F02M 35/10386; F02B 39/10; Y02T 10/40; G01M 15/09

See application file for complete search history.

(56) References Cited

U.S. PATENT DOCUMENTS 6,701,282 B2    3/2004   Ting et al.
8,006,670 B2 *  8/2011   Rollinger ............ F02D 41/0087
                                                        123/481
(Continued)

FOREIGN PATENT DOCUMENTS

EP          3239488 A2      11/2017
WO       2015195371 A1     12/2015

OTHER PUBLICATIONS

Dudar, A., "System and Method for Diagnosing a Variable Displacement Engine," U.S. Appl. No. 15/608,806, filed May 30, 2017, 40 pages.

(Continued)

*Primary Examiner* — Phutthiwat Wongwian
*Assistant Examiner* — Arnold Castro
(74) *Attorney, Agent, or Firm* — Geoffrey Brumbaugh; McCoy Russell LLP

(57) ABSTRACT

Systems and methods for determining operation of a cylinder deactivating/reactivating device are disclosed. In one example, a direction of engine rotation is selected to maximize air flow through the engine while the engine is rotated without combusting air and fuel. Operation of one or more cylinder valve deactivating mechanisms is assessed while the engine is rotated without combusting air and fuel.

20 Claims, 11 Drawing Sheets

(51) Int. Cl.
  *F02M 35/10*  (2006.01)
  *F02B 39/10*  (2006.01)
  *F02D 41/18*  (2006.01)
  *F02D 41/12*  (2006.01)
  *F01L 1/053*  (2006.01)

(52) U.S. Cl.
  CPC ............... *F02D 2200/0402* (2013.01); *F02D 2200/0406* (2013.01); *F02D 2250/06* (2013.01)

(56) References Cited

U.S. PATENT DOCUMENTS

| | | | |
|---|---|---|---|
| 8,353,198 B2 * | 1/2013 | Burkhardt | F02D 41/0007 |
| | | | 73/47 |
| 8,667,835 B2 | 3/2014 | Doering et al. | |
| 8,925,302 B2 | 1/2015 | Ruona et al. | |
| 9,378,594 B2 | 6/2016 | Wong et al. | |
| 10,094,304 B1 * | 10/2018 | Dudar | F02N 11/0818 |
| 10,571,366 B2 * | 2/2020 | Dudar | G01M 15/106 |
| 10,710,575 B2 * | 7/2020 | Dudar | F02M 35/09 |
| 10,760,517 B2 * | 9/2020 | Dudar | F02B 39/10 |
| 2010/0175462 A1 * | 7/2010 | Doering | G01M 15/09 |
| | | | 73/114.31 |
| 2010/0175463 A1 * | 7/2010 | Doering | F02D 41/221 |
| | | | 73/114.37 |
| 2017/0114744 A1 * | 4/2017 | Martin | F02D 41/22 |
| 2017/0122229 A1 | 5/2017 | Ossareh et al. | |
| 2017/0137022 A1 | 5/2017 | Dudar | |
| 2018/0010532 A1 | 1/2018 | Dudar | |
| 2019/0017427 A1 * | 1/2019 | Dudar | F02D 13/0215 |
| 2019/0195158 A1 * | 6/2019 | Dudar | F02D 41/221 |
| 2019/0293031 A1 * | 9/2019 | Dudar | F01N 3/10 |

OTHER PUBLICATIONS

Dudar, A., "Method for Engine Laser Ignition System," U.S. Appl. No. 15/822,525, filed Nov. 27, 2017, 57 pages.

Dudar, A., "Systems and Methods for Cylinder Exhaust Valve Diagnostics," U.S. Appl. No. 15/863,796, filed Jan. 5, 2018, 52 pages.

\* cited by examiner

SYSTEM AND METHOD FOR DIAGNOSING A VARIABLE DISPLACEMENT ENGINE

BACKGROUND AND SUMMARY

Cylinders of an engine may be selectively deactivated to conserve fuel while other cylinders continue to operate to propel a vehicle and to keep the engine rotating. The cylinders may be deactivated by holding intake and exhaust valves of deactivated cylinders in a closed state over an entire engine cycle (e.g., two revolutions for a four stroke engine). Efficiency of cylinders that remain activated increases by improving thermal efficiency and reducing engine pumping losses. Selected cylinders may be deactivated and reactivated responsive to driver demand torque and other vehicle operating conditions. For example, at low engine loads, an eight cylinder engine may combust air and fuel in four cylinders. On the other hand, the same eight cylinder engine may combust air and fuel in all eight cylinders during high driver demand conditions. In other examples, a single cylinder may be deactivated at a time, the identity of the deactivated cylinder varied over a rolling window. In this way, a variable displacement engine (VDE) may enter and exit cylinder deactivation modes (also known as VDE modes) to accommodate different driving conditions.

Over time and varying vehicle operating conditions, the possibility of degradation of one or more valve actuators that selectively activate and deactivate engine cylinder valves may increase. Exhaust valves may be more prone to leakage than intake valves due to higher levels of local carbon deposits. If the valve actuator mechanism is faulty and the valves are not sealing properly, fuel economy is impacted as the inability to seal the cylinder results in a pumping loss which can offset the fuel economy gains from the VDE operation. Continuing to run an engine with leaky exhaust valves from carbon build-up can also thermally damage the valve due to the combustion event releasing large amounts of heat around the valve edges. Drivability issues may also arise as unaccounted air and/or fuel vapors are directed from the leaking cylinder toward an exhaust catalyst. Further, exhaust emissions may be degraded. Accordingly, VDE valve actuation mechanisms may be periodically diagnosed.

One example diagnostic is shown by Doering et al. in U.S. Pat. No. 8,667,835. Therein, VDE valve mechanism degradation is indicated based on a change (e.g., increase or decrease) in manifold pressure over successive induction events of an engine. In particular, the change in manifold pressure over each induction event is correlated with a commanded change in induction state of a cylinder as valves are deactivated.

However, the inventors herein have identified potential issues with such an approach. As one example, since the approach requires the actuation of the VDE mechanism, the opportunities to diagnose the VDE mechanism are limited. VDE mechanisms are typically activated during vehicle travel on a highway and/or cruise conditions when the average engine load is light. If the drive cycle includes largely city driving (with frequent stops and starts), or if the engine is operating under a heavy load (such as when towing operation or carrying a heavy load), conditions for entering a VDE mode may not occur for an extended duration. As a result, it may not be possible to diagnose the VDE mechanism on the drive cycle.

Other example approaches for diagnosing the sealing performance of a cylinder valve deactivation mechanism rely on in-cylinder pressure measurement. However, such approaches may require expensive pressure sensors. Still other methods that correlate the commanded change in induction state with sensed torque changes may lack sufficient clarity and resolution. For example, it may be difficult to differentiate loss of torque due to VDE mechanism degradation from other factors that can contribute to loss of torque, such as cylinder misfire, fuel injector degradation, or spark plug degradation. Further still, a signal to noise ratio for detecting cylinder valve actuator degradation may be low while the engine is operating because exhaust gas recirculation (EGR), barometric pressure, and other engine operating conditions may affect the signal to noise ratio of signals used to determine valve actuator degradation.

In one example, the above issues may be at least partly addressed by an engine operating method, comprising: rotating an engine, unfueled, in a direction reversed from fueled engine rotation; and indicating valve actuator degradation responsive to an intake manifold pressure change rate, sensed without deactivating valves of a plurality of engine cylinders, being less than a threshold different from another intake manifold pressure change rate sensed while deactivating valves of at least one of the plurality of engine cylinders. In this way, cylinder valve actuators may be diagnosed more frequently, and more reliably, while using existing sensors.

As an example, after a duration (e.g., hours) has elapsed since a last key-off event, and while an engine is shut-down, an engine control module may be woken up from a sleep mode. The engine may then be rotated, unfueled, in a direction reversed from a direction the engine rotates in while combusting air and fuel. For example, the engine may be rotated in reverse via an electric motor coupled to an electric H-bridge circuit. The reverse rotation causes the intake and exhaust valves to reverse roles, resulting in the drawing of air from the exhaust manifold via the exhaust valve into the intake manifold via the intake valve. A baseline intake manifold flow and associated steady-state manifold pressure may be established with the valve mechanism of all cylinders active, such as via an existing intake manifold pressure sensor (MAP sensor). Then, cylinders may be deactivated en masse to shift the engine to a VDE mode. For example, valves for 4 cylinders of an 8 cylinder engine may be commanded closed to shift the engine to the VDE mode (e.g., 4 cylinders of one engine bank may be commanded closed while 4 cylinders of another engine bank are maintained active). With half the cylinders operating to "charge" the intake manifold, the time constant required to reach the previously established baseline flow is expected to be larger. If the time constant to achieve a target pressure/flow in the VDE mode is longer than that in the non-VDE mode, it may be inferred that the valve mechanisms are functional. Else, if the time constant in the VDE mode is substantially the same as that in the non-VDE mode, it may be inferred that the valve mechanism for at least one of the cylinders commanded closed is degraded. In an alternate example, such as where the engine is configured to deactivate cylinders individually according to a defined pattern (rolling VDE), each cylinder may be individually deactivated in a rolling manner and a family of curves with increasing time constants may be established for each time a cylinder is deactivated. Responsive to a gap in the family of curves when a particular cylinder is commanded closed, degradation of a VDE mechanism of the corresponding cylinder may be indicated.

In still further examples, additionally or optionally, after waking up, the controller may park a cylinder with a suspected exhaust valve issue in a position where the intake valve is open and the exhaust valve is purportedly closed. The controller may then spin an electric booster coupled to the intake manifold (such as an electric motor coupled to an intake compressor of a turbocharger or electric supercharger) in a direction reversed from a direction the compressor rotates in when the engine is operating boosted. For example, the electric booster may be rotated in reverse via an electric motor coupled to the H-bridge circuit. The intake manifold air flow with the electric booster operating (such as sensed via the MAP sensor or a MAF sensor) is compared to a baseline flow for the given cylinder (such as a baseline flow established with the electric booster running at the same speed during engine testing). A higher than baseline flow is indicative of the exhaust valve not being fully sealed when commanded to close.

In one example, responsive to sluggish engine performance, the controller may perform the reverse engine rotation based diagnostic to identify potentially degraded cylinder mechanisms. The controller may then perform the reverse compressor rotation based diagnostic to pinpoint the identity of the degraded cylinder mechanisms from the suspected cylinders. Alternatively, the controller may select between the diagnostics based on engine operating conditions including a battery state of charge or battery voltage. The selection may also be based on ambient or barometric pressure.

In this way, by rotating an engine or an electric intake compressor via an electric machine in a reverse direction and measuring engine air flow while the engine is rotating, it may be possible to provide the technical result of determining whether or not one or more cylinder valve actuator mechanisms are degraded. In particular, the reverse rotation may provide an increased amount of air flow through the engine as compared to if the engine were rotated in a forward direction because of inherent differences between intake and exhaust valve timing. The increased air flow may provide an improved signal to noise ratio so that valve actuator diagnostics may be improved. Further, a higher air flow rate through the engine may allow the engine to be rotated at a lower speed while still being able to detect cylinder valve actuator degradation reliably. The lower speed may conserve battery power, improving fuel economy. The technical effect of performing the diagnostic while the engine is not combusting fuel is that the interfering effect of poor combustion and degraded fuel injectors or spark plugs is also removed. By using a MAP (or MAF) sensor to determine the intake airflow profile during the reverse rotation while the engine is in the VDE mode, an existing sensor can be repurposed for the VDE diagnostic, reducing system cost and complexity. By comparing the air flow of a suspected cylinder(s) in a VDE mode with a baseline air flow established when the engine is operating with all cylinders active, a leaky exhaust valve of a deactivated cylinder can be identified with high fidelity, allowing for mitigating actions to be specified for the relevant cylinder.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
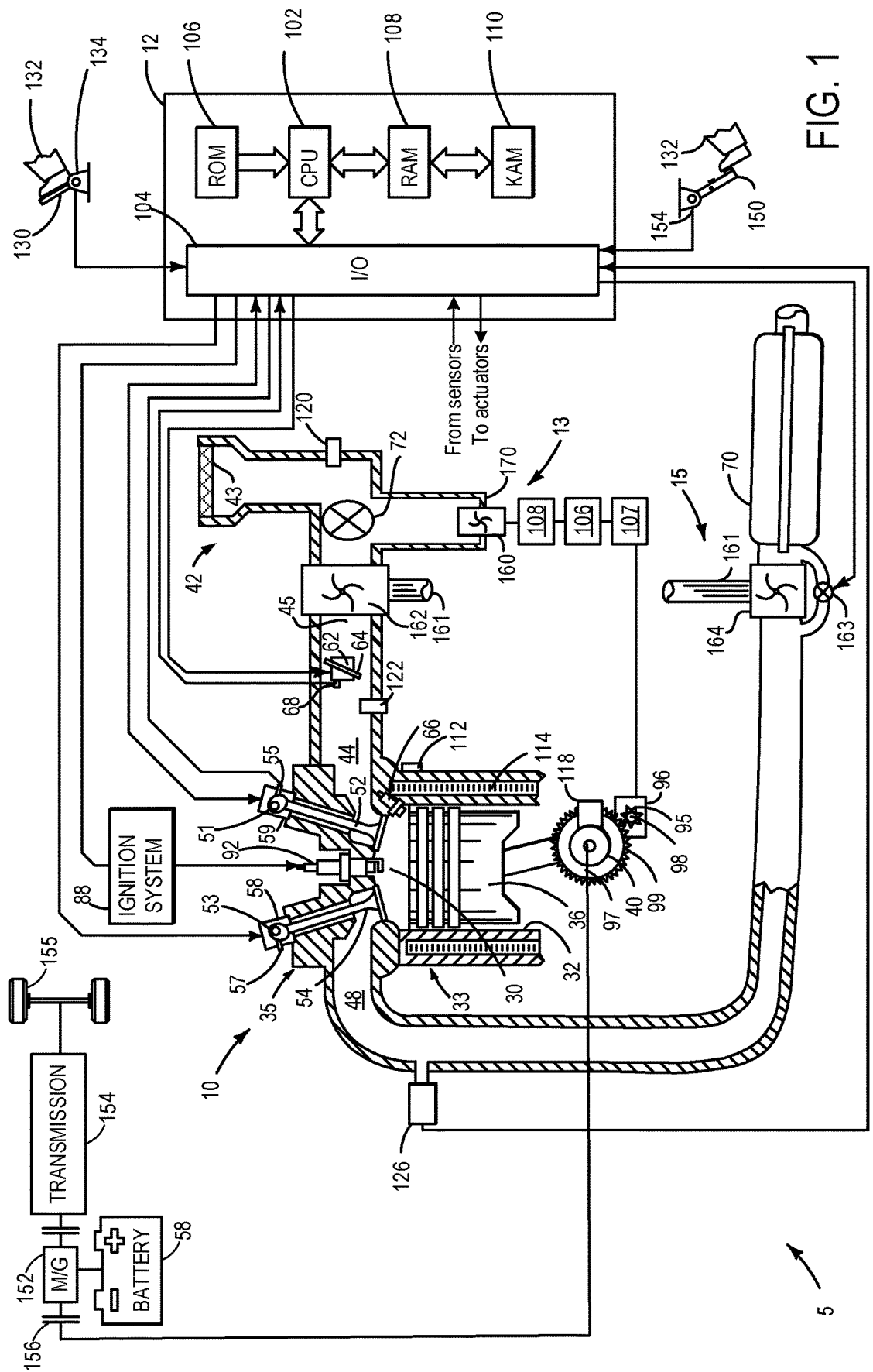
FIG. 1 shows a schematic diagram of one cylinder of an example engine system.
Figure 2:
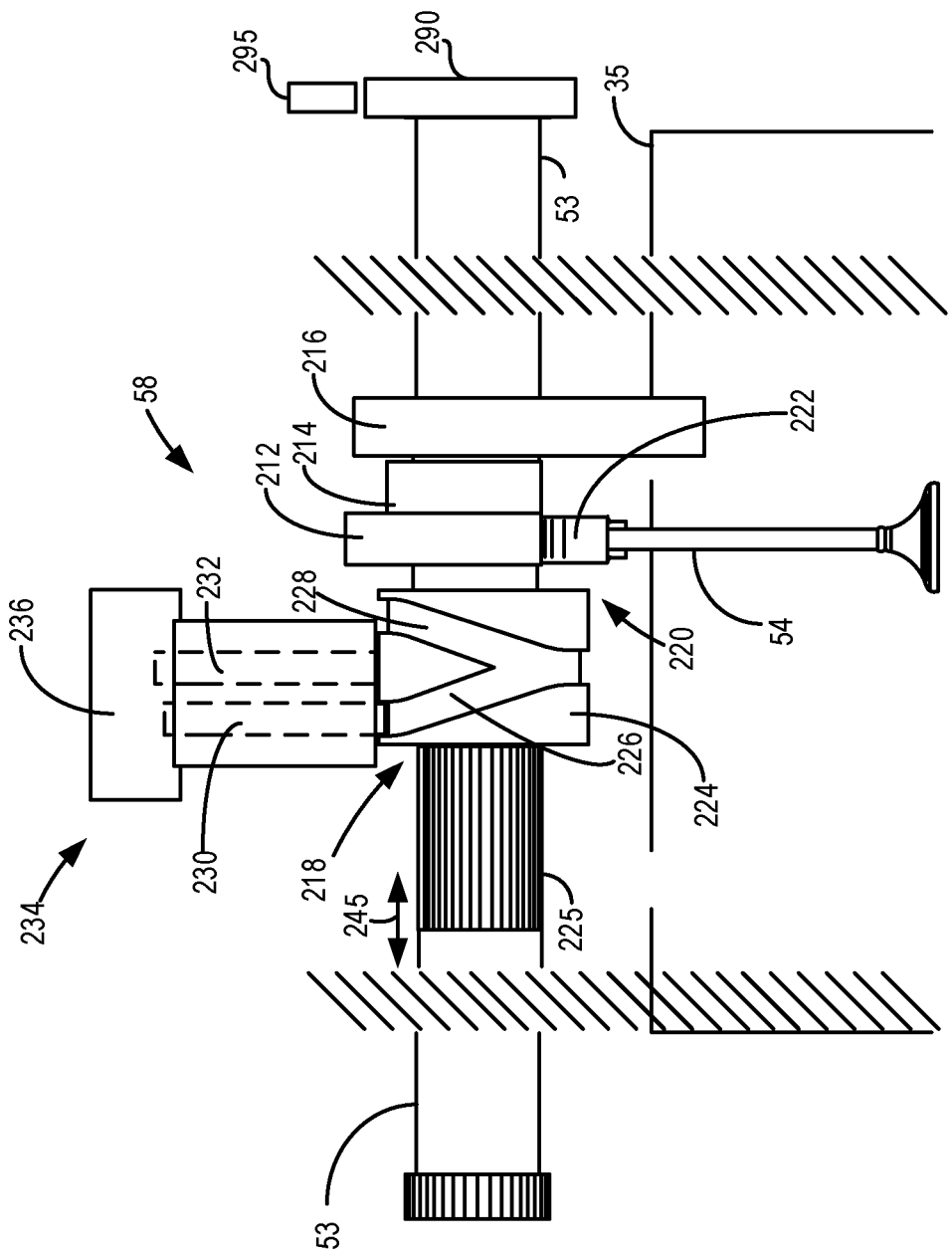
FIG. 2 shows an example cylinder valve activating/deactivating device.
Figure 3A:
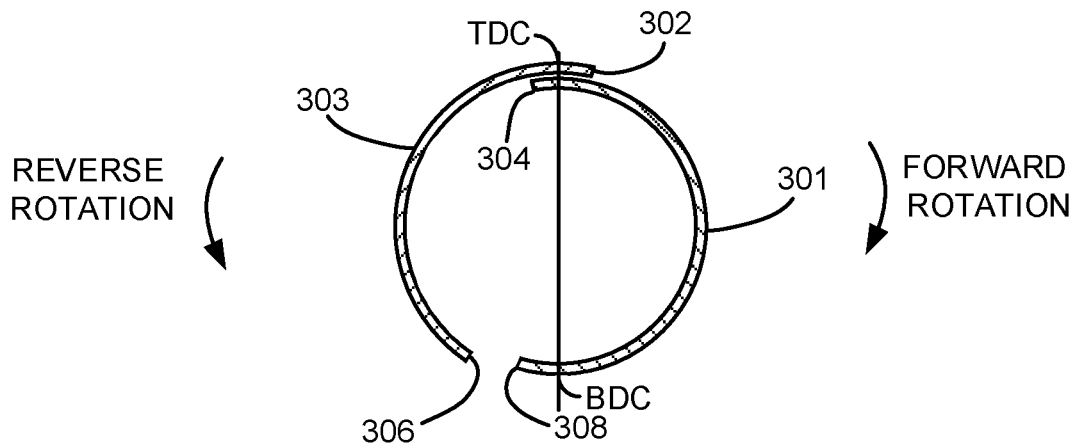
FIGS. 3A and 3B show example cylinder valve opening timings.
Figure 3B:
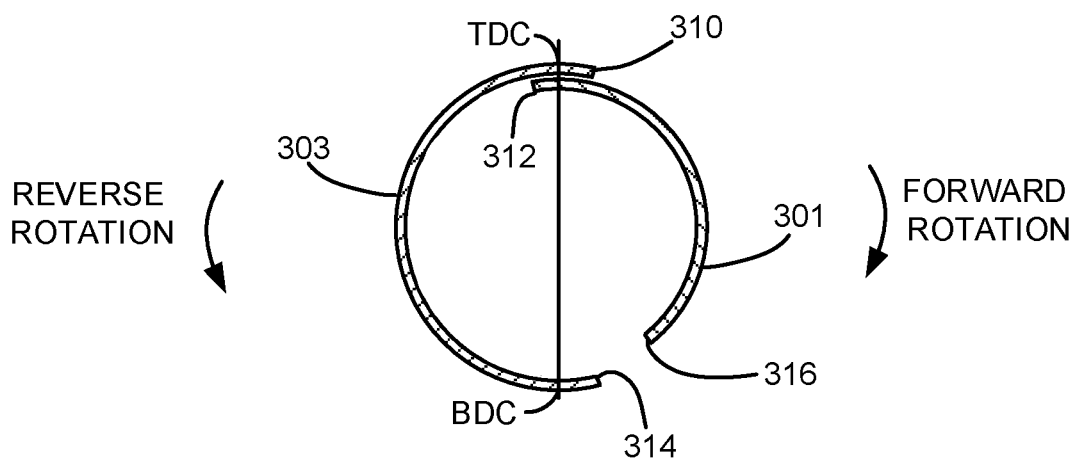
Figure 4A:
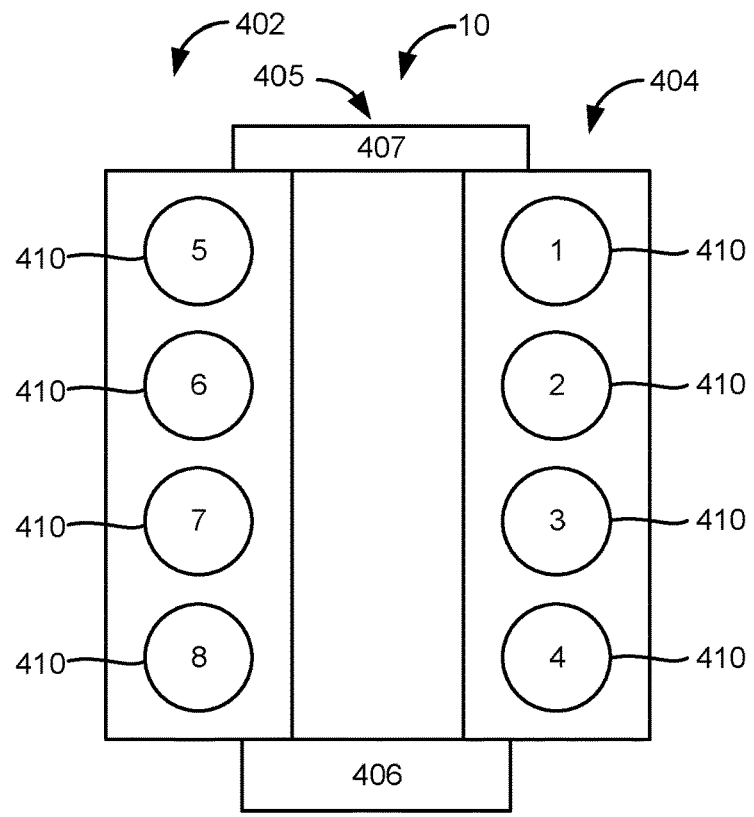
FIGS. 4A and 4B show example cylinder configurations.
Figure 4B:
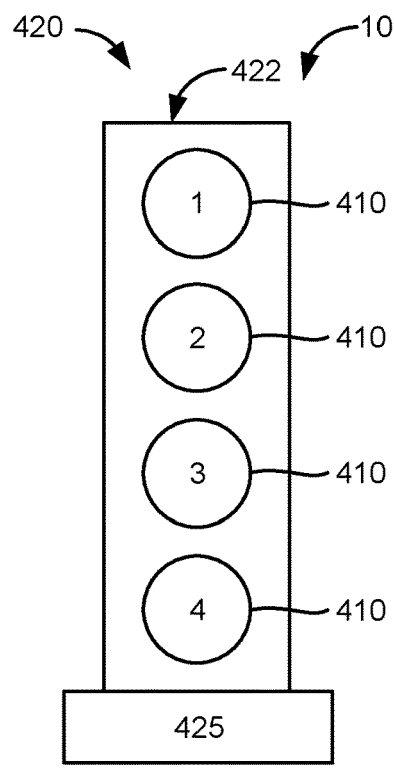
Figure 8:
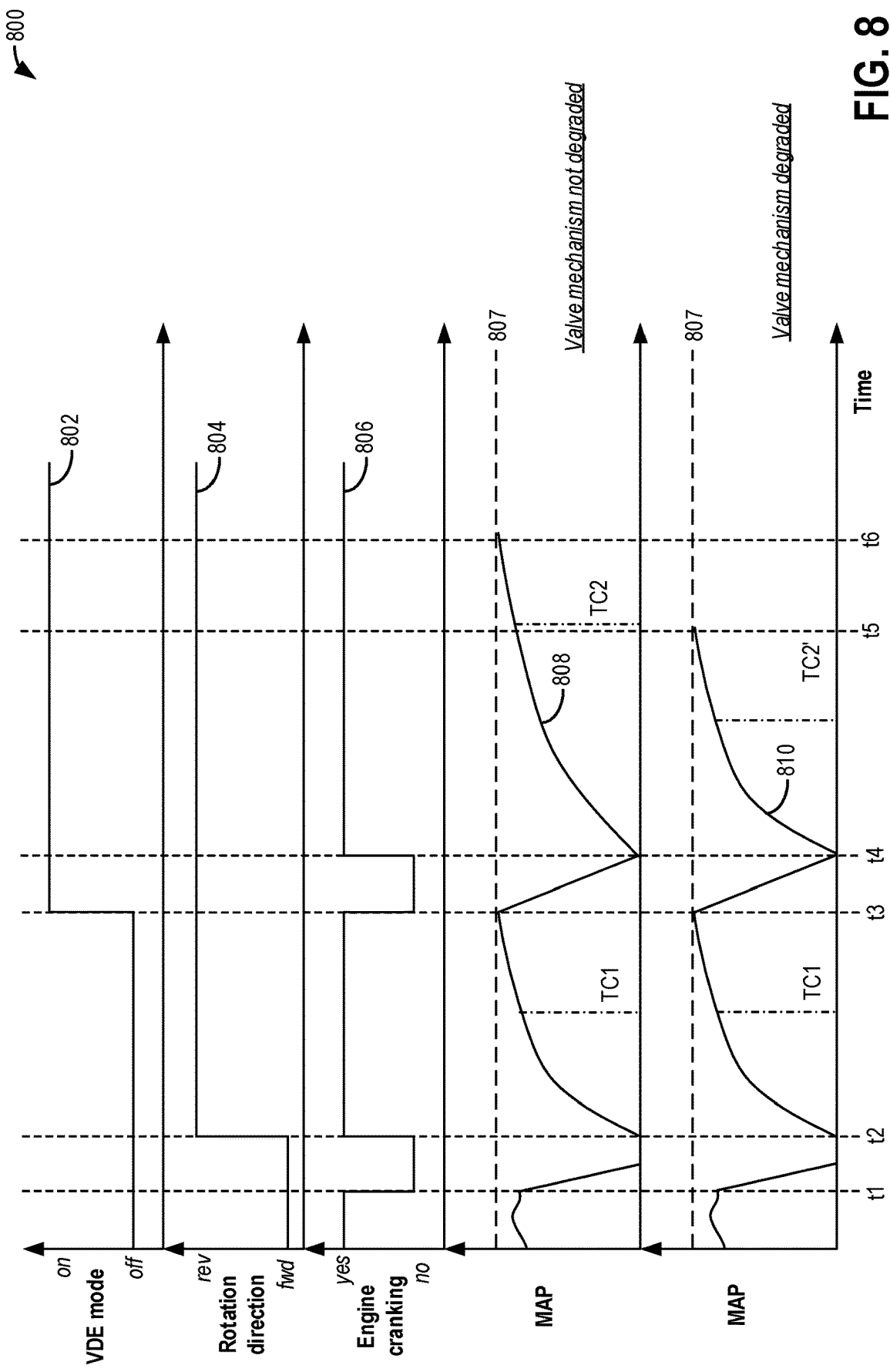
FIG. 8 compares an example MAP profile of a reverse rotated engine in a VDE mode, provided via en masse deactivation of selected cylinders, to the engine reverse rotated while in a non-VDE mode.
Figure 9:
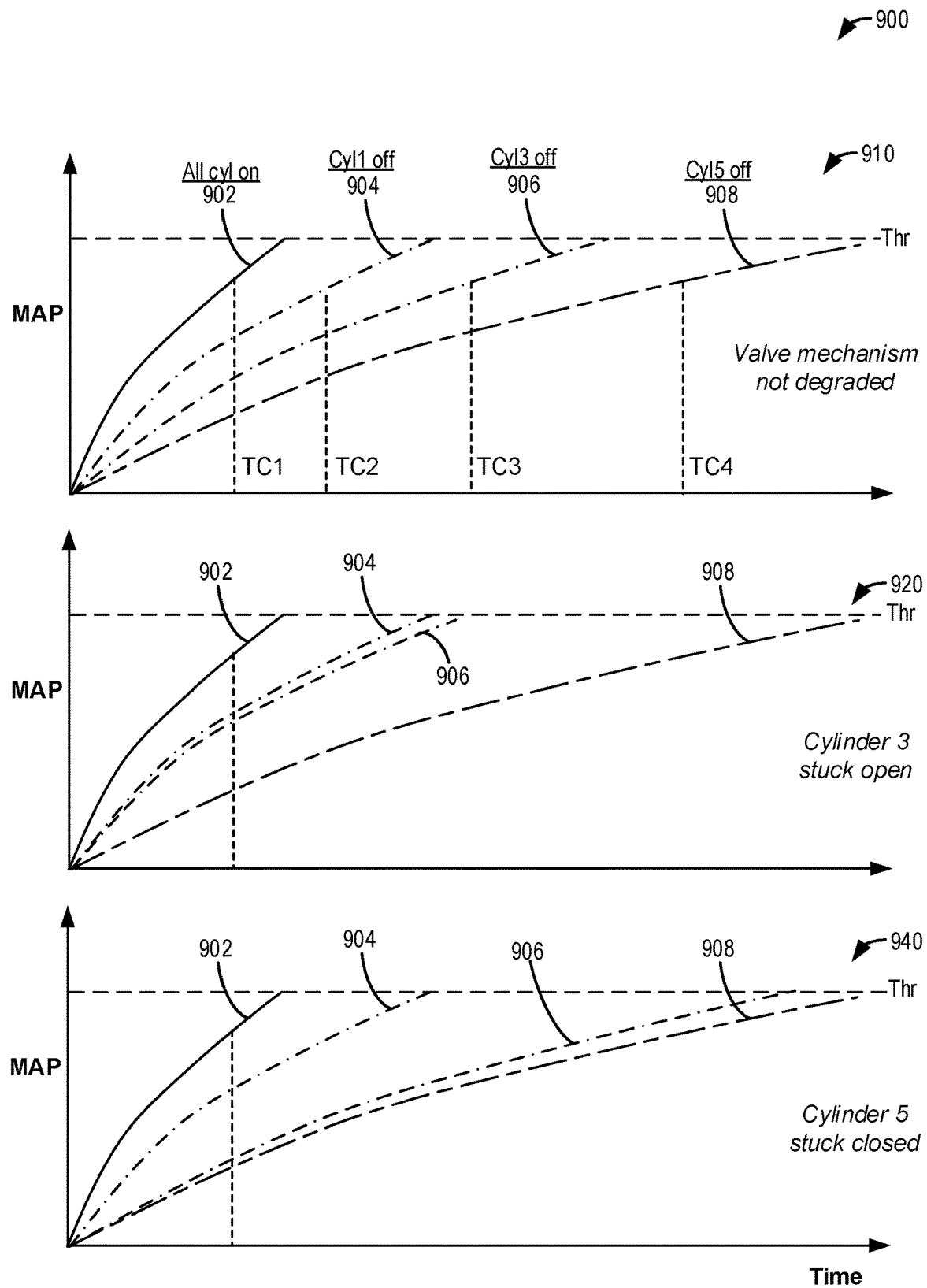
FIG. 9 compares an example MAP profile of a reverse rotated engine in a VDE mode, provided via rolling deactivation of a single cylinder.
Figure 10:
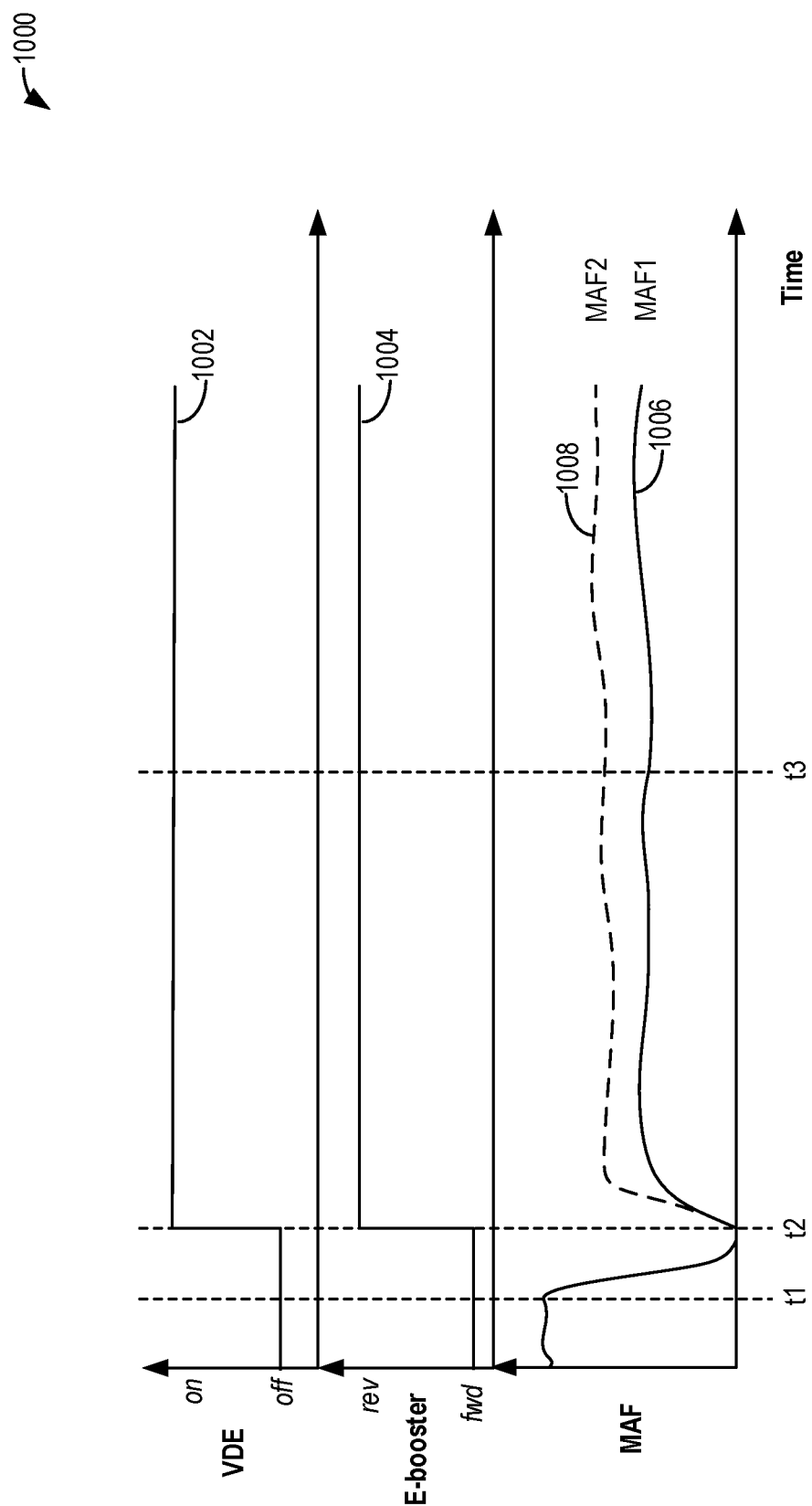
FIG. 10 compares an example MAF profile during reverse rotation of an electric booster of a shut-down engine in a VDE mode to a MAP profile established when the engine is in a non-VDE mode.
Figure 11:
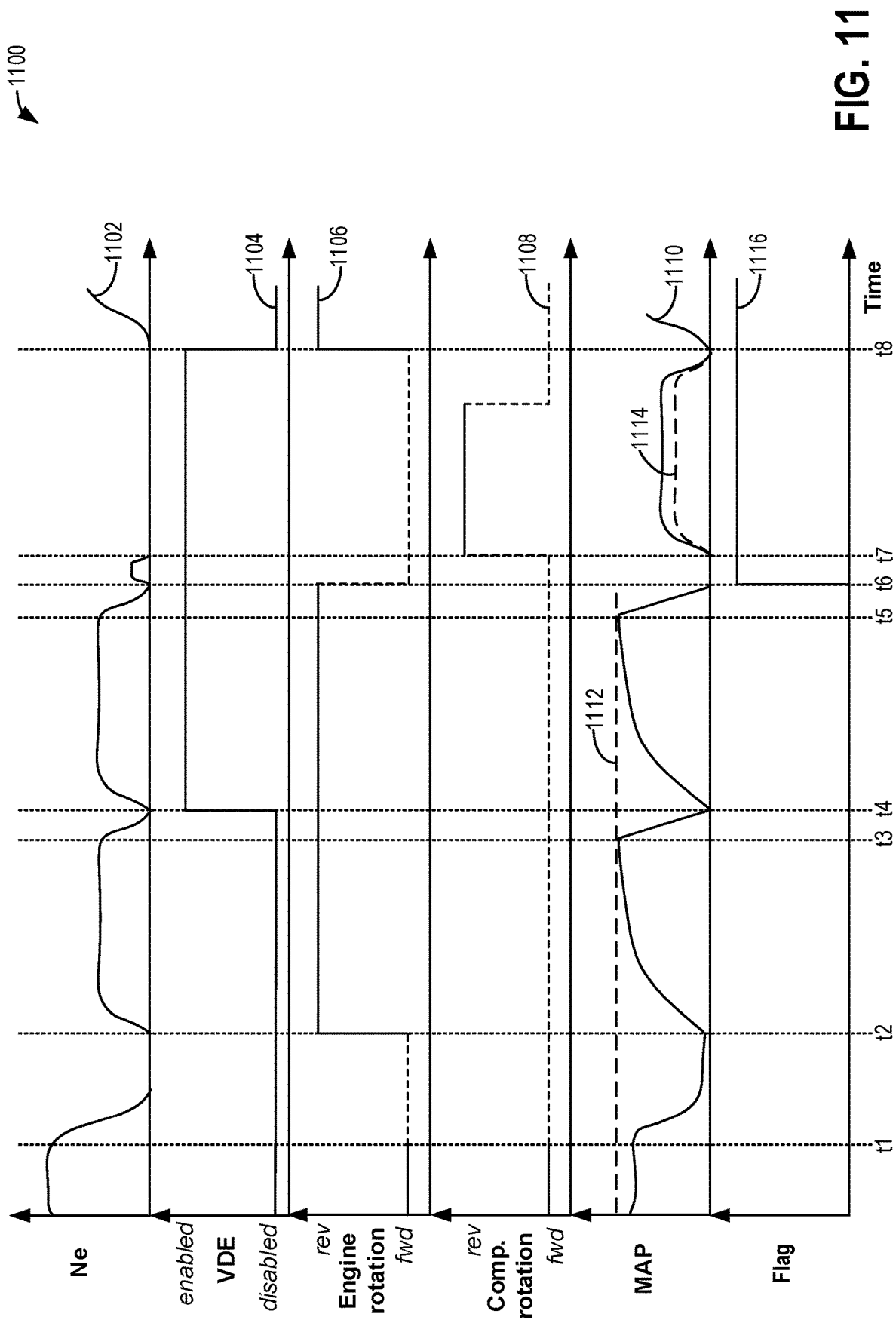
FIG. 11 depicts a prophetic example of a VDE diagnostic operation according to the present disclosure.

The present description is related to providing diagnosing operation of an engine that includes actuating mechanisms for cylinder valves, such as the engine system of FIG. 1. The actuating mechanisms may be included in the engine to selectively deactivate intake and exhaust valves of engine cylinders to activate and deactivate engine cylinder modes. An example actuating mechanism for cylinder valves is shown in FIG. 2. Example valve timings are shown in FIGS. 3A-3B while example engine cylinder configurations are shown in FIGS. 4A and 4B. An engine controller may perform a control routine, such as the example routines of FIGS. 5-6, to diagnose cylinder valve actuator degradation based on a change in intake manifold airflow while an engine or an electric booster is rotated in a reverse direction. Reverse rotation may be enabled via use of an H-bridge circuit, such as the circuit shown in FIGS. 7A-B. An example MAP profile that may be used for identifying valve actuator degradation while an engine is operated in a VDE mode via en masse deactivation of selected cylinders is shown at FIG. 8. An example MAP profile that may be used for identifying valve actuator degradation while an engine is operated in a VDE mode via rolling deactivation of individual engine cylinders is shown at FIG. 9. The examples of FIGS. 8-9 rely on reverse engine rotation via an electric machine. An example MAF profile that may be used for identifying valve actuator degradation using reverse compressor operation is shown at FIG. 10. A prophetic example of performing VDE diagnostics following a vehicle key-off event is shown at FIG. 11.

Referring to FIG. 1, internal combustion engine 10, comprising a plurality of cylinders, one cylinder of which is shown in FIG. 1, is controlled by electronic engine controller 12. Engine 10 is comprised of cylinder head 35 and block 33, which include combustion chamber 30 and cylinder walls 32. Piston 36 is positioned therein and reciprocates via a connection to crankshaft 40. Flywheel 97 and ring gear 99 are coupled to crankshaft 40. Starter 96 (e.g., low voltage (operated with less than 30 volts) electric machine) includes pinion shaft 98 and pinion gear 95. Pinion shaft 98 may selectively advance pinion gear 95 to engage ring gear 99. Starter 96 may be directly mounted to the front of the engine or the rear of the engine. In some examples, starter 96 may selectively supply torque to crankshaft 40 via a belt or chain. In one example, starter 96 is in a base state when not engaged to the engine crankshaft. Starter 96 may rotate in a forward direction (e.g., clockwise) or in a reverse direction (e.g., counter clockwise) via being supplied electrical power by an H bridge circuit 107 (such as shown with reference to FIGS. 7A-B). The H-bridge may reverse polarize a voltage supplied to the electric machine coupled to the engine crankshaft to spin the engine in reverse. Alternatively the starter 96 may be coupled to a reversing circuit which is used to adjust the engine rotation direction. Therein, the starter is electrically coupled to the reversing circuit to drive the engine in the reverse direction, and electrically decoupled from the reversing circuit to drive the engine in the forward direction.

During a first condition, such as when combusting fuel in the engine cylinder, the starter may be rotated in the forward direction to enable engine forward rotation. Then, during a second, different condition, such as when performing a VDE diagnostic after a key-off event, the starter may be rotated in the reverse direction to enable engine backward rotation. When the engine is rotated forward, air is drawn from the intake manifold through an intake valve and directed to an exhaust manifold through an exhaust valve. When the engine is rotated backward, air is drawn from the exhaust manifold through the exhaust valve and directed to the intake manifold through the intake valve. In other examples, integrated starter/generator (ISG) 111 may rotate engine 10 and ISG 111 may be directly coupled to crankshaft 40 or coupled to crankshaft 40 via a belt.

Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57. Intake valve 52 may be selectively activated and deactivated by valve actuator device 59. Exhaust valve 54 may be selectively activated and deactivated by valve actuator device 58. Valve actuator devices 58 and 59 may be as shown in FIG. 2 or other known configurations.

Fuel injector 66 is shown positioned to inject fuel directly into cylinder 30, which is known to those skilled in the art as direct injection. Fuel injector 66 delivers liquid fuel in proportion to the pulse width from controller 12. Fuel is delivered to fuel injector 66 by a fuel system (not shown) including a fuel tank, fuel pump, and fuel rail (not shown). In one example, a high pressure, dual stage, fuel system may be used to generate higher fuel pressures.

In the depicted embodiment, engine 10 is a boosted engine including multiple, staged boosting devices. Specifically, engine 10 includes a first electric compressor 160 of an electric supercharger 13 staged upstream of a second mechanical compressor 162 of a turbocharger 15. Herein, the supercharger is an auxiliary boosting device and the turbocharger is a primary boosting device, although other configurations may be possible. For example, in alternate embodiments, turbocharger 15 may be an electric turbocharger having an electric motor coupled to the compressor, turbine, or turbocharger shaft while the supercharger is configured as an electrical or mechanical supercharger. In still other examples, both the boosting devices may be electric superchargers or electric turbochargers.

Electric compressor 160 is driven by electric motor 108 along a supercharger compressor shaft. The electric motor is powered by an on-board energy storage device, such as system battery 106. In some examples, electric compressor 160 may additionally be driven by the engine crankshaft via a clutch and gear mechanism. An amount of electrical power delivered to electric motor 108 may be varied in order to adjust a duty cycle of the supercharger. In one example, the amount of electric power delivered to electric motor 108 may be increased to increase the speed of electric compressor 110. As a result of the electrical assistance, supercharger 13 may be rapidly spun up, providing for a fast-acting or high frequency boost actuation.

As elaborated herein, during a first condition (such as during a tip-in), electric motor 108 may be operated to rotate electric compressor 160 in a forward direction to provide boost assist. During a second, different condition (such as after a key-off event) electric motor 108 may be operated to rotate electric compressor 160 in a reverse direction to perform cylinder valve actuator diagnostics. Motor 108 may be electrically coupled to H-bridge circuit 107 (described at FIGS. 7A-7B) that enables the motor to rotate forwards or backwards, in turn rotating the electric compressor forwards or backwards. The H-bridge may reverse polarize a voltage supplied to the electric motor to spin the compressor in reverse. Alternatively motor 108 may be coupled to a reversing circuit which is used to adjust the compressor rotation direction. Therein, the motor is electrically coupled to the reversing circuit to drive the compressor in the reverse direction, and electrically decoupled from the reversing circuit to drive the compressor in the forward direction.

Air may enter electric compressor 160 when the opening of a bypass valve 72 is decreased, thereby directing incoming air from air intake 42 into compressor bypass 170 and electric compressor 160, where it is pressurized for delivery to the turbocharger compressor 162. Fresh air received at an inlet of turbocharger compressor 162 is then compressed and introduced into engine 10. As the opening of bypass valve 72 increases, an amount of air entering turbocharger compressor 162 without having passed through bypass 70 and electric compressor 160 increases. During conditions when bypass valve 72 is fully opened, compressed air may be delivered to engine 10 via the turbocharger compressor 162 only. By spinning up the electric supercharger via the electric motor, a burst of boost pressure may be rapidly provided to the engine to reduce turbo lag and/or assist in boost delivery.

Turbocharger 15 includes mechanical compressor 162, which is mechanically driven by exhaust turbine 164 via shaft 161, the turbine 164 driven by expanding engine exhaust. The turbocharger may be a twin scroll device, or a variable geometry turbocharger (VGT) for example. Fresh air is introduced along engine intake 42 into engine 10 via air filter 43 and flows to turbocharger compressor 162. Compressor 162 is coupled to throttle valve 64 through a charge-air cooler (not shown). Intake manifold pressure (e.g., a pressure of the air charge within the intake manifold) may be determined using a manifold absolute pressure (MAP) sensor 122.

During an operator tip-in event, when going from engine operation without boost to engine operation with boost responsive to an increase in operator torque demand, turbo lag can occur. This is due to delays in turbine 164 spin-up due to the turbocharger being a slower-acting compression device, and momentary reduction in flow through turbocharger compressor 162 when throttle valve 64 opens at the tip-in. The same may also occur when the engine is operating boosted and there is a transient increase in boost demand due to an increase in accelerator pedal application by the vehicle operator. To reduce this turbo lag, during those selected conditions, both supercharger 13 and turbocharger 15 may be enabled. In particular, the faster-acting electric supercharger, also referred to as an e-booster, may be used to improve the transient boost response. Responsive to the tip-in, waste-gate actuator 193 may be closed (e.g., fully closed) to increase exhaust flow through turbine 164. While turbine 164 spins-up, boost pressure can be transiently provided by electric compressor 160. Enabling supercharger 13 may include drawing energy from system battery 106 to spin electric motor 108 and thereby accelerate electric compressor 160. In addition, bypass valve 72 may be closed (e.g., fully closed) so as to enable a larger portion of intake air to flow through bypass 70 and be compressed by electric compressor 110. When the turbine has sufficiently spun up and the turbocharger is capable of providing the requested amount of boost, electric compressor 160 may be decelerated by disabling electric motor 108 (e.g., by discontinuing the supply of power to electric motor 108). In addition, bypass valve 72 may be opened so as to enable a larger portion of air to bypass electric compressor 160.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, read-only memory 106 (e.g., non-transitory memory), random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing force applied by human foot 132; a position sensor 154 coupled to brake pedal 150 for sensing force applied by human foot 132, a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120 (e.g., mass air flow sensor); and a measurement of throttle position from sensor 68. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

In some examples, engine 10 is coupled in a hybrid vehicle 5 with multiple sources of torque available to one or more vehicle wheels 55. In other examples, vehicle 5 is a conventional vehicle with only an engine, or an electric vehicle with only electric machine(s). In the example shown, vehicle 5 includes engine 10 and an electric machine 152. Electric machine 152 may be a motor or a motor/generator. Crankshaft 40 of engine 10 and electric machine 152 are connected via a transmission 154 to vehicle wheels 155 when one or more clutches 156 are engaged. In the depicted example, a first clutch 156 is provided between crankshaft 40 and electric machine 152, and a second clutch 156 is provided between electric machine 152 and transmission 154. Controller 12 may send a signal to an actuator of each clutch 156 to engage or disengage the clutch, so as to connect or disconnect crankshaft 140 from electric machine 152 and the components connected thereto, and/or connect or disconnect electric machine 152 from transmission 154 and the components connected thereto. Transmission 154 may be a gearbox, a planetary gear system, or another type of transmission. The powertrain may be configured in various manners including as a parallel, a series, or a series-parallel hybrid vehicle.

Electric machine 152 receives electrical power from a traction battery 58 to provide torque to vehicle wheels 155. Electric machine 152 may also be operated as a generator to provide electrical power to charge battery 58, for example during a braking operation.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC).

During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion.

During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

Controller 12 is configured to receive information from the various system sensors and send control signals to the various system actuators. The various system sensors include exhaust gas sensor 126 located upstream of turbine 164, MAP sensor 122, MAF sensor 120, throttle position sensor 68, etc. The various system actuators include throttle valve 64, bypass valve 72, electric motor 108, waste-gate actuator 163, fuel injector 66, H-bridge 107, etc. Controller 12 may receive input data from the various sensors, process the input data, and employ the various actuators to adjust engine operation based on the received signals and instructions stored on a memory of the controller. The controller may employ the actuators in response to the processed input data based on instruction or code programmed therein corresponding to one or more routines, such as example control routines described herein with regard to FIGS. 5 and 6. As an example, responsive to a boost pressure deficiency when operating the turbocharger, the controller may actuate the electric motor driving the supercharger compressor, actuate the bypass closed, and actuate the H-bridge to a first setting in order to provide additional boost via forward rotation of the supercharger compressor. As another example, responsive to diagnostic conditions for a cylinder valve actuator being met, the controller may actuate the electric motor and actuate the H-bridge to a second setting to flow air from an exhaust manifold to an intake manifold, through a cylinder while the engine is at rest, via backward rotation of the supercharger compressor.

FIG. 2 shows an example cylinder valve actuator 58 for application in engine 10 shown in FIG. 1. Cylinder valve actuator 58 adjusts a lift and/or valve opening duration of a cylinder exhaust valve 54 in response to engine operating conditions. Cylinder valve actuator 58 may provide zero valve lift for one or more engine cycles to deactivate cylinder exhaust valves 54. Exhaust camshaft 53 is shown positioned above a cylinder head 35 of an engine cylinder bank. Exhaust valve 54 is configured to open and close an exhaust port in a cylinder, such as the cylinder shown in FIG. 1. For example, exhaust valve 54 may be actuatable between an open position allowing gas exchange into or out of a cylinder and a closed position substantially blocking gas exchange into or out of the cylinder. It should be understood that though only one valve is shown in FIG. 2, engine 10 shown in FIG. 1 may include any number of cylinder valves. Further, a cylinder valve actuator similar to cylinder valve actuator 58 may be applied to engine intake valves. In addition, engine 10 of FIG. 1 may include any number of cylinders with associated valves and a variety of different cylinder and valve configurations may be used, e.g., V-6, I-4, I-6, V-12, opposed 4, and other engine types.

One or more cam towers or camshaft mounting regions may be coupled to cylinder head 35 to support exhaust camshaft 53. For example, cam tower 216 is shown coupled to cylinder head 35 adjacent to exhaust valve 54. Though FIG. 2 shows a cam tower coupled to the cylinder head, in other examples, the cam towers may be coupled to other components of an engine, e.g., to a camshaft carrier or the cam cover. The cam towers may support overhead camshafts and may separate the lift mechanisms positioned on the camshafts above each cylinder.

Exhaust valve 54 may operate in a plurality of lift and duration modes, e.g., a high valve lift, low or partial valve lift, short opening duration, long opening duration, and zero valve lift. For example, as described in more detail below, by adjusting cylinder cam mechanisms, the valves on one or more cylinders, e.g., exhaust valve 54, may be operated in different lift modes based on engine operating conditions.

Exhaust camshaft 53 may include a plurality of cams configured to control the opening and closing of the exhaust valves. For example, FIG. 2 shows a first cam lobe 212 and a second cam lobe 214 positioned above valve 54. The cams lobes may have different shapes and sizes to form lift profiles used to adjust an amount and timing of a lifting of valve 54 while exhaust camshaft 53 rotates. For example, exhaust cam 212 may be a full lift cam lobe and cam 214 may be a zero lift cam lobe. Though, FIG. 2 shows two lift profiles associated with first cam 212 and second cam 214, it should be understood that any number of lift profile cams may be present, e.g., three different cam lobes.

Exhaust camshaft 53 includes a mechanism 218 coupled to the camshaft above the exhaust valve 54 for adjusting an amount of valve lift for that exhaust valve 54 and/or for deactivating that exhaust valve by changing a location of cam lobes along the camshaft relative to exhaust valve 54. For example, the cam lobes 212 and 214 may be slideably attached to the camshaft so that they can slide along the camshaft in an axial direction on a per-cylinder basis. For example, a plurality of cam lobes, e.g., cam lobes 212 and 214, positioned above each cylinder valve, e.g., exhaust valve 54, may be slid across the camshaft in directions indicated by arrow 245 to change a cam lobe profile coupled to the valve follower, e.g., follower 220 coupled to exhaust valve 54, to change the exhaust valve opening and closing durations and lift amounts. The valve cam follower 220 may include a roller finger follower (RFF) 222 which engages with a cam lobe positioned above valve 202. For example, in FIG. 2, roller 222 is shown engaging with full lift cam lobe 212.

Additional follower elements not shown in FIG. 2 may further include push rods, rocker arms, tappets, etc. Such devices and features may control actuation of the intake valves and the exhaust valves by converting rotational motion of the cams into translational motion of the valves. In other examples, the valves can be actuated via additional cam lobe profiles on the camshafts, where the cam lobe profiles between the different valves may provide varying cam lift height, cam duration, and/or cam timing. However, alternative camshaft (overhead and/or pushrod) arrangements could be used, if desired. Further, in some examples, cylinders may each have only one exhaust valve and/or intake valve, or more than one intake and/or exhaust valves. In still other examples, exhaust valves and intake valves may be actuated by a common camshaft. However, in an alternate example, at least one of the intake valves and/or exhaust valves may be actuated by its own independent camshaft or other device.

An outer sleeve 224 may be coupled to the cam lobes 212 and 214 splined to exhaust camshaft 53. Camshaft position relative to the engine crankshaft is determined via rotation sensing camshaft position sensor 295 and exhaust camshaft position indicator 290. Exhaust camshaft 53 may be coupled with a cam phaser that is used to vary the valve timing with respect to crankshaft position. By engaging a pin, e.g., one of the pins 230 or 232, into a grooved hub in the outer sleeve, the axial position of the sleeve can be repositioned to that a different cam lobe engages the cam follower coupled to exhaust valve 54 in order to change the lift of the exhaust valve 54. For example, sleeve 224 may include one or more displacing grooves, e.g., grooves 226 and 228, which extend around an outer circumference of the sleeve. The displacing grooves may have a helical configuration around the outer sleeve and, in some examples, may form a Y-shaped or V-shaped groove in the outer sleeve, where the Y-shaped or V-shaped groove is configured to engage two different actuator pins, e.g., first pin 230 and second pin 232, at different times in order to move the outer sleeve to change a lift profile for exhaust valve 54. Sleeve 224 is shown in a first position while pin 232 shifts sleeve 224 to the left side of FIG. 2. Sleeve 224 follows spline 225 in an axial direction along exhaust camshaft 53 when profiles are being switched. Further, a depth of each groove in sleeve 224 may decrease along a length of the groove so that after a pin is deployed into the groove from a home position, the pin is returned to the home position by the decreasing depth of the groove as the sleeve and camshaft rotate.

For example, as shown in FIG. 2, when first pin 230 is deployed into groove 226, outer sleeve 224 will shift in a direction toward cam tower 216 while exhaust camshaft 53 rotates thus positioning cam lobe 212 above valve 202 and changing the lift profile. In order to switch back to cam lobe 214, second pin 232 may be deployed into groove 228 which will shift outer sleeve 224 away from cam tower 216 to position cam lobe 214 above valve 202. In some examples, multiple outer sleeves containing lobes may be splined to exhaust camshaft 53. For example, outer sleeves may be coupled to cam lobes above every valve in engine 10 or a select number of lobes above the valves.

Actuator pins 230 and 232 are included in a cam lobe switching actuator 234 which adjusts the positions of the pins 230 and 232 in order to switch cam lobes positioned above a valve 202. Exhaust cam lobe switching actuator 234 includes an activating mechanism 236, which may be hydraulically powered, or electrically actuated, or combinations thereof. Activating mechanism 236 changes positions of the pins in order to change lift profiles of a valve. For example, activating mechanism 236 may be a coil coupled to both pins 230 and 232 so that when the coil is energized, e.g., via a current supplied thereto from the control system, a force is applied to both pins to deploy both pins toward the sleeve.

Figure 7A:
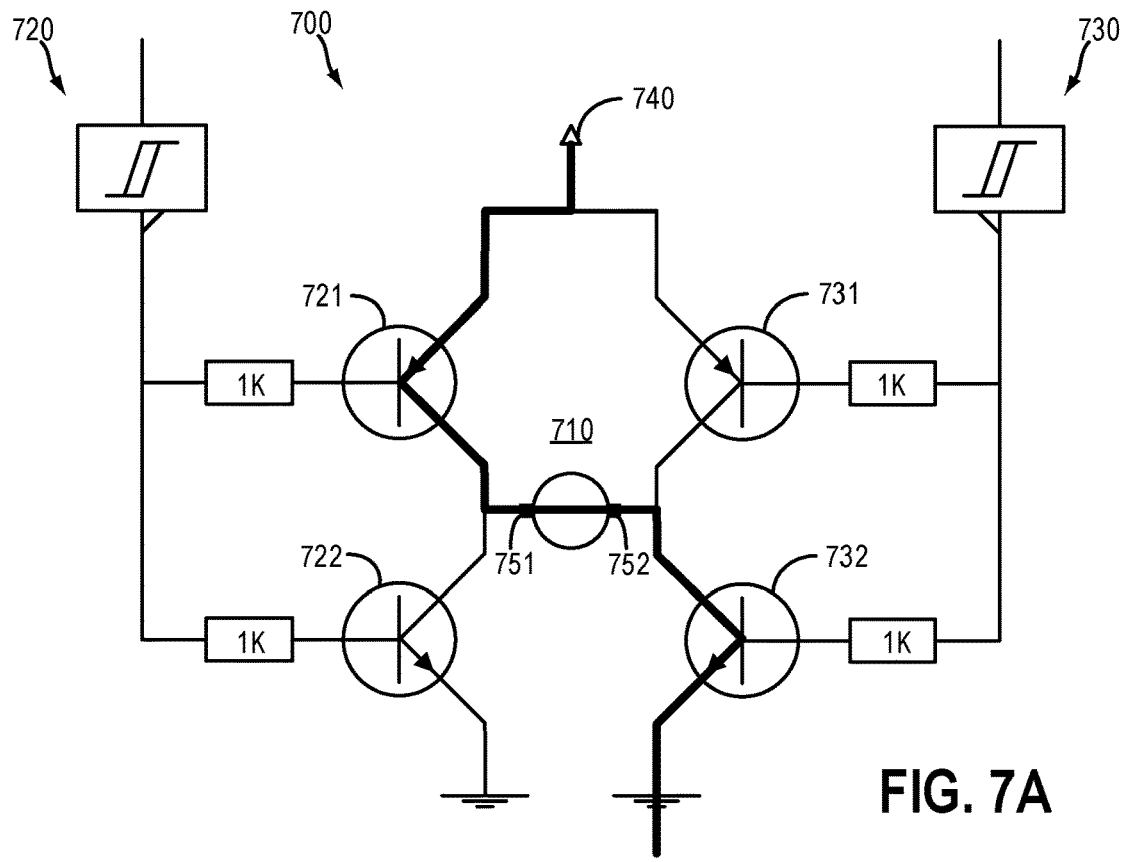
FIGS. 7A-7B schematically depict an example H-bridge circuit that may be used to reverse the direction of rotation of an engine and/or an electrically actuated intake compressor.
Figure 7B:
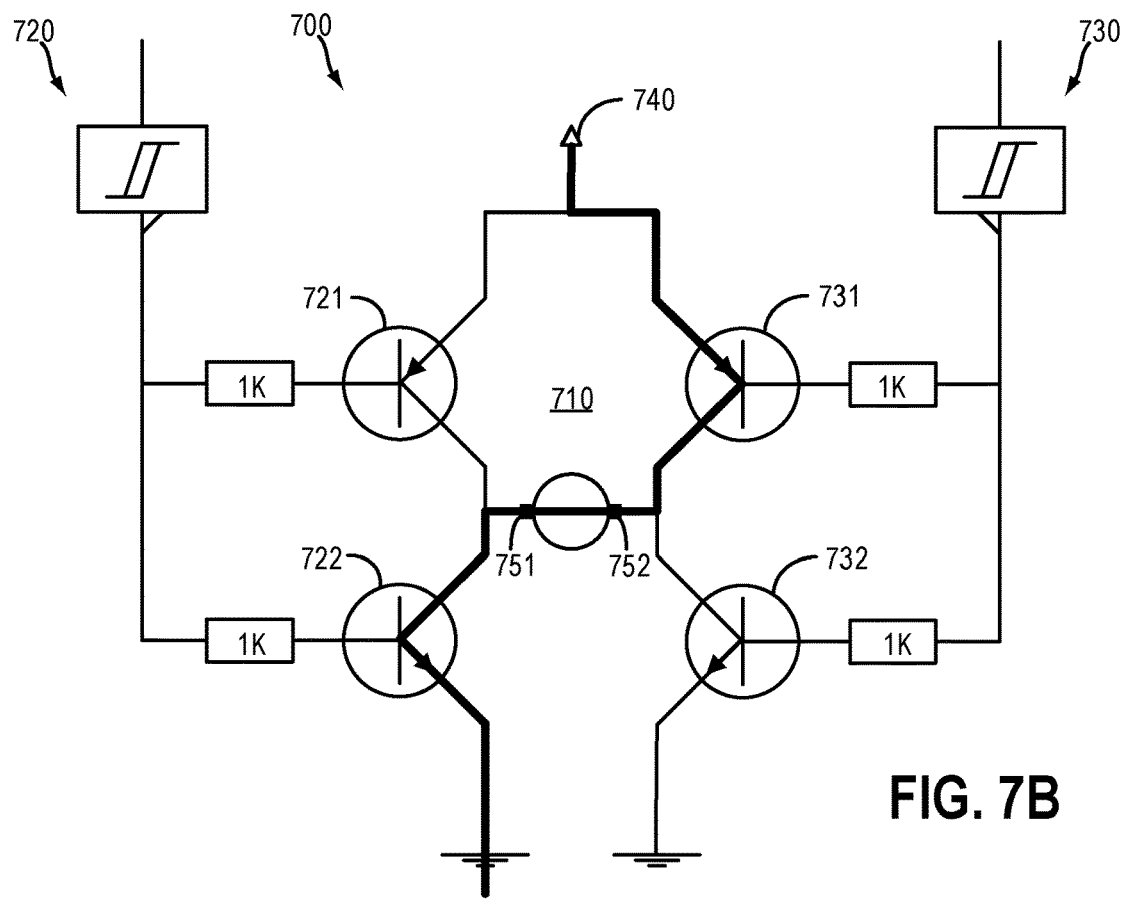

FIGS. 7A and 7B show an example circuit 700 that may be used for reversing a spin orientation of an electric motor. The electric motor may be used to drive an engine or an electric compressor. Circuit 700 schematically depicts an H-Bridge circuit that may be used to run a motor 710 in a first (forward) direction and alternately in a second (reverse) direction. Circuit 700 comprises a first (LO) side 720 and a second (HI) side 730. Side 720 includes transistors 721 and 722, while side 730 includes transistors 731 and 732. Circuit 700 further includes a power source 740.

In FIG. 7A, transistors 721 and 732 are activated (energized), while transistors 722 and 731 are off. In this configuration, the left lead 751 of motor 710 is connected to power source 740, and the right lead 752 of motor 710 is connected to ground. In this way, motor 700 may run in a forward (or default) direction. When operating the engine in a forward direction via the motor, the engine may be in a cranking mode for initial combustion commencement. Additionally and/or alternatively, when operating the engine in a forward direction via the motor, the engine (and motor or another motor) may be in a drive mode to drive the vehicle. It may be understood that in some examples, the engine may be spun in the forward (e.g. default) direction under conditions where the vehicle is stationary and it is desired only for the engine to be spun or rotated in the forward direction, without combustion.

In FIG. 7B, transistors 722 and 731 are activated (energized), while transistors 721 and 732 are off. In this configuration, the right lead 752 of motor 710 is connected to power source 770, and the left lead 751 of motor 710 is connected to ground. In this way, motor 710 may run in a reverse direction.

In this way, the systems of FIGS. 1, 2, and 7A-B provide for an engine system, an engine including one or more cylinder valve deactivating mechanisms; an electric machine including one of a starter motor, an integrated starter/generator, and an electric motor; an H-bridge circuit coupled to the electric machine; an electric compressor coupled to an intake manifold of the engine, the electric compressor housed in a bypass; an intake manifold pressure sensor; a comparator circuit; and a controller including executable instructions stored in non-transitory memory to: following a key-off event, waking up the comparator circuit; while rotating the engine, unfueled via the electric machine, in a direction reversed from fueled engine rotation, comparing a first manifold pressure change rate without deactivating valves of a subset of all engine cylinders to a second manifold pressure change rate while deactivating valves of the subset; indicating valve actuator degradation for one cylinder of the subset responsive to a lower than threshold difference between the first manifold pressure change rate and the second manifold pressure change rate; and responsive to the indicating, identifying the one cylinder by rotating the compressor via the electric machine in a direction reversed from boosted engine rotation, while holding the engine in a position where the one cylinder is in an intake stroke top dead center, the identifying based on a steady-state manifold pressure during the rotating relative to a threshold pressure. As an example, rotating the engine, unfueled via the electric machine, in the direction reversed from fueled engine rotation and by rotating the compressor via the electric machine in the direction reversed from boosted engine rotation includes actuating the H-bridge coupled to the electric machine to a setting where a voltage supplied to the electric machine is reverse polarized. In another example, the identifying includes indicating valve actuator degradation for the one cylinder responsive to the steady-state manifold pressure during the rotating exceeding the threshold pressure. Further, deactivating valves of the subset of all engine cylinders comprises holding intake and exhaust valves for each cylinder of the subset in a closed state for at least two consecutive engine revolutions.

Referring now to FIG. 3A, example valve timings for rotating an engine in a forward direction (e.g., clockwise) when diagnosing cylinder valve actuators is shown. Forward and reverse engine rotation directions are indicated by arrows. Exhaust valve open timing is represented by the outer ring 303. Intake valve open timing is represented by the inner ring 301. The valve timings are referenced to cylinder positions top-dead-center (TDC) and bottom-dead-center (BDC). The exhaust valve closing time (EVC) when the engine is rotated in a forward direction is at 302. The exhaust valve opening (EVO) time when the engine is rotated in a forward direction is at 306. The intake valve closing (IVC) time when the engine is rotated in a forward direction is at 308. The intake valve opening (IVO) time when the engine is rotated in a forward direction is at 304. If the engine is rotated in a reverse direction, EVO occurs at 302 and EVC occurs at 306. IVO occurs at 308 and IVC occurs at 304.

Thus, it may be observed that the intake valve opening duration is longer than the exhaust valve opening duration. Further, IVO is near TDC and IVC is near BDC for rotating the engine in a forward direction. EVO is after BDC and EVC is after TDC for rotating the engine in the forward direction. Rotating the engine in the reverse direction allows air to be inducted from the exhaust manifold and expelled to the intake manifold such that air is drawn into the cylinder when the exhaust valve is open and expelled from the cylinder when the intake valve is open. Therefore, air flow through the engine when the engine is rotated with an open intake throttle and unfueled in a forward direction is greater than air flow through the engine when the engine is rotated with the intake throttle open and unfueled in a reverse direction at a same engine speed. The increased air flow through the engine while the engine is rotated at a first speed in a forward direction is due to the longer intake valve opening duration and intake valve opening and closing timings. The decreased air flow through the engine while the engine is rotated at the first speed in a reverse direction is due to the shorter exhaust valve opening duration and exhaust valve opening and closing timings as compared to the intake valve opening duration and the intake valve opening and closing times.

Referring now to FIG. 3B, example valve timings for rotating an engine in a reverse direction (e.g., counter clockwise) when diagnosing cylinder valve actuators is shown. Forward and reverse engine rotation directions are indicated by arrows. Exhaust valve open timing is represented by the outer ring 303. Intake valve open timing is represented by the inner ring 301. The valve timings are referenced to cylinder positions top-dead-center (TDC) and bottom-dead-center (BDC). The exhaust valve closing time (EVC) when the engine is rotated in a forward direction is at 310. The exhaust valve opening (EVO) time when the engine is rotated in a forward direction is at 314. The intake valve closing (IVC) time when the engine is rotated in a forward direction is at 316. The intake valve opening (IVO) time when the engine is rotated in a forward direction is at 312. If the engine is rotated in a reverse direction, EVO occurs at 310 and EVC occurs at 314. IVO occurs at 316 and IVC occurs at 312.

Thus, it may be observed that the exhaust valve opening duration is longer than the intake valve opening duration. Further, IVO is near TDC and IVC is well advanced of BDC for rotating the engine in a forward direction. EVO is near BDC and EVC is near TDC for rotating the engine in the forward direction. Rotating the engine in the reverse direction allows air to be inducted from the exhaust manifold and expelled to the intake manifold such that air is drawn into the cylinder when the exhaust valve is open and expelled from the cylinder when the intake valve is open. For these reasons, air flow through the engine when the engine is rotated with an open intake throttle and unfueled in a reverse direction is greater than air flow through the engine when the engine is rotated with the intake throttle open and unfueled in a forward direction at a same engine speed. The increased air flow through the engine while the engine is rotated at a first speed in a reverse direction is due to the longer exhaust valve opening duration and exhaust valve opening and closing timings. The decreased air flow through the engine while the engine is rotated at the first speed in a forward direction is due to the shorter intake valve opening duration and intake valve opening and closing timings as compared to the exhaust valve opening duration and the exhaust valve opening and closing times. Thus, whether air flow through an engine while rotating the engine in a forward direction at a first speed is greater than air flow through the engine while rotating the engine in a reverse direction at the first speed depends on intake and exhaust valve timings, including valve opening durations and valve opening and closing times. Consequently, for some engine configurations, rotating an engine in a forward direction provides more air flow through the engine for a given engine speed as compared to rotating the same engine at the same given speed in a reverse direction. On the other hand, other engines may provide more air flow through the engine at a given engine speed when rotated in a reverse direction as compared to rotating the same engine at the same speed in the forward direction.

Referring now to FIG. 4A, a first configuration of engine 10 is shown. Engine 10 includes two cylinder banks 402 and 404. First cylinder bank 404 includes cylinders 410 numbered 1-4. Second cylinder bank 402 includes cylinders 410 numbered 5-8. Thus, the first configuration is a V8 engine comprising two cylinder banks. All cylinders operating may be a first (V8) cylinder operating mode. Front 405 of engine 10 includes an accessory drive 407, which may include pumps, fans, etc. Transmission 406 is shown coupled to a rear side of engine 10.

During select conditions, one or more of cylinders 410 may be deactivated via ceasing to flow fuel to the deactivated cylinders. Further, air flow to deactivated cylinders may cease via closing and holding closed intake and exhaust valves of the deactivated cylinders, thereby deactivating the intake and exhaust valves. The engine cylinders may be deactivated in a variety of patterns to provide a desired actual total number of activated or deactivated cylinders. For example, a plurality of cylinders may be deactivated en masse to form a first pattern of deactivated cylinders. As a first example of en masse deactivation, half of the total number of cylinders may be deactivated (to provide a V4 mode) by deactivating all cylinders on one of the two cylinder banks while combusting in all cylinders on the other of the two cylinder banks (e.g., cylinders 1-4 may be deactivated while cylinders 5-8 are active, or vice versa). As a second example of en masse deactivation, half of the total number of cylinders may be deactivated with an equal number of cylinders deactivated on each bank, the cylinders selected based on their firing order and/or position along the engine bank (e.g., cylinders 2, 3, 5, and 8 may be deactivated while cylinders 1, 4, 6, and 7 are active, or vice versa). In a third example of en masse deactivation, half the cylinders may be deactivated but the deactivated cylinders may be distributed asymmetrically between the banks. In still other examples of en masse deactivation, less than half of the total number of cylinders may be deactivated. It will be appreciated that in some engine configurations, the en masse deactivation pattern is a defined pattern that is based on the cam profile or the arrangement of the valve deactivation mechanisms. For example, in the V8 engine of FIG. 4A, cylinder deactivation pattern may always result in engine operation in a V4 mode, and the same set of 4 cylinders may always be deactivated.

Alternatively, cylinders may be deactivated according to a rolling VDE pattern where the identity of the deactivated cylinder(s) is varied over successive combustion events. This may be enabled via individual cylinder deactivation mechanisms coupled to each engine cylinder. As an example, during conditions when a single cylinder is to be deactivated, cylinder 1 may be deactivated first for a first number of combustion events (e.g., for one event), following which cylinder 1 may be reactivated and cylinder 3 may be deactivated for a second number of combustion events (e.g., for one event). Thereafter, cylinder 3 may be reactivated and cylinder 5 may be deactivated for a third number of combustion events (e.g., for one event), and so on. The same approach may be used when more cylinders are to be deactivated (e.g., cylinders 1 and 3 deactivated first, followed by cylinders 5 and 7, etc.).

Referring now to FIG. 4B, a second configuration of engine 10 is shown. Engine 10 includes one cylinder bank 422. Cylinder bank 406 includes cylinders 410 numbered 1-4. Thus, the first configuration is an I4 engine comprising one cylinder bank. All cylinders operating may be a first cylinder (I-4) operating mode for this engine configuration. Cylinder number one is nearest to front of engine 420.

Similar to the first configuration, one or more of cylinders 410 may be deactivated via ceasing to flow fuel to the deactivated cylinders. Further, air flow to deactivated cylinders may cease via closing and holding closed intake and exhaust valves of the deactivated cylinders. The engine cylinders may be deactivated in a variety of patterns to provide a desired actual total number of activated or deactivated cylinders. For example, cylinders 2 and 3 may be deactivated while cylinders 1 and 4 are active (or vice versa) to form a first example pattern of en masse deactivated cylinders. Alternatively, cylinders may be deactivated in a rolling VDE pattern based on their firing order. For example, if the firing order is 1-3-4-2, during a VDE mode, cylinder 1 may be deactivated first, then cylinder 3 may be deactivated while cylinder 1 is reactivated, then cylinder 4 may be deactivated while cylinder 3 is reactivated, and so on.

In still other examples, different cylinder configurations may be provided. For example, the engine may be a V6 engine or a V10 engine. The different engine configurations may also have different rolling VDE and en masse VDE patterns of cylinder deactivation.

Figure 5:
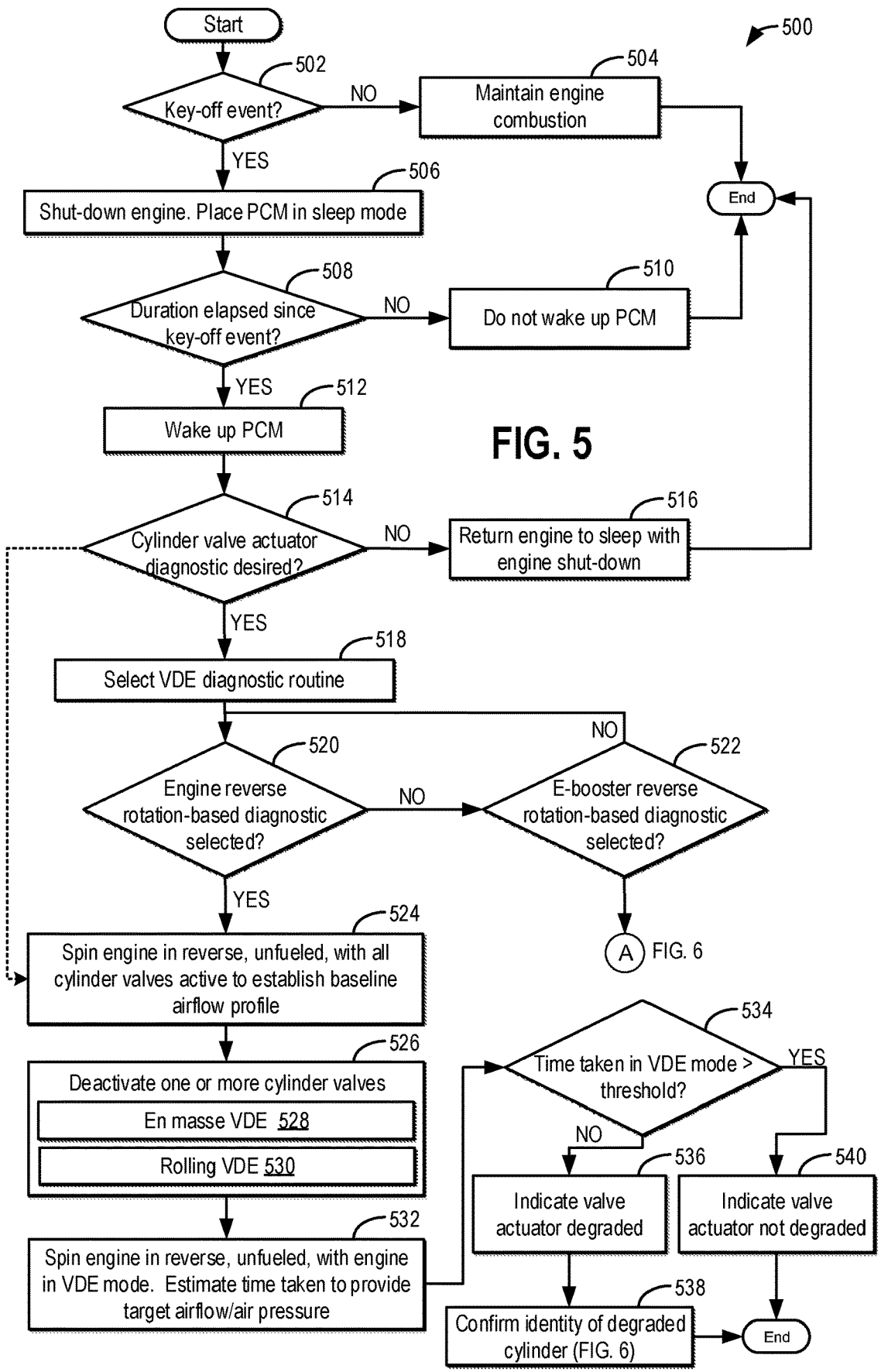
FIGS. 5-6 shows a high-level flowchart of an example method for diagnosing a cylinder valve deactivation mechanism.

In this way, the components of FIGS. 1-4B enables an engine system comprising an engine including one or more cylinder valve deactivating mechanisms; an electric machine including one of a starter motor, an integrated starter/generator, and an electric motor; an H-bridge circuit coupled to the electric machine; an electric compressor coupled to an intake manifold of the engine, the electric compressor housed in a bypass; an intake manifold pressure sensor; a comparator circuit; and a controller including executable instructions stored in non-transitory memory to: following a key-off event, waking up the comparator circuit; while rotating the engine, unfueled via the electric machine, in a direction reversed from fueled engine rotation, comparing a first manifold pressure change rate without deactivating valves of a subset of all engine cylinders to a second manifold pressure change rate while deactivating valves of the subset; indicating valve actuator degradation for one cylinder of the subset responsive to a lower than threshold difference between the first manifold pressure change rate and the second manifold pressure change rate; and responsive to the indicating, identifying the one cylinder by rotating the compressor via the electric machine in a direction reversed from boosted engine rotation, while holding the engine in a position where the one cylinder is in an intake stroke top dead center, the identifying based on a steady-state manifold pressure during the rotating relative to a threshold pressure. Additionally or optionally, rotating the engine, unfueled via the electric machine, in the direction reversed from fueled engine rotation and by rotating the compressor via the electric machine in the direction reversed from boosted engine rotation may include actuating the H-bridge coupled to the electric machine to a setting where a voltage supplied to the electric machine is reverse polarized. Additionally or optionally, the identifying includes indicating valve actuator degradation for the one cylinder responsive to the steady-state manifold pressure during the rotating exceeding the threshold pressure. Additionally or optionally, deactivating valves of the subset of all engine cylinders comprises holding intake and exhaust valves for each cylinder of the subset in a closed state for at least two consecutive engine revolutions. Referring now to FIG. 5, an example method 500 for diagnosing cylinder valve deactivation mechanisms for an engine is shown. The method enables cylinder valve deactivation mechanisms to be reliably diagnosed using existing engine system sensors during conditions when signal to noise ratio of the sensors can be improved, such as while the engine is shut-down. The operating sequence of FIG. 5 may be produced via the system of FIGS. 1 and 2, and may be applied for engine configurations of FIGS. 4A and 4B. At least portions of the methods of FIG. 5 may be incorporated as executable instructions stored in non-transitory memory while other portions of the method may be performed via a controller transforming operating states of devices and actuators in the physical world. Instructions for carrying out method 500 and the rest of the methods included herein may be executed by the controller (e.g., controller 12 of FIG. 1) based on instructions stored on the memory of the controller and in conjunction with signals received from sensors of the engine system, such as the sensors described above with reference to FIG. 1. The controller may employ engine actuators of the engine system, such as an electric motor (such as motor 108, 152 of FIG. 1), an H-bridge (such as bridge 107), and an intake throttle (such as throttle valve 64 of FIG. 1), to adjust engine operation according to the methods described below.

At 502, method 500 includes confirming an engine key-off event. The key-off event signals that the engine, and the vehicle housing the engine, is not being operated. In one example, an engine key-off event may be confirmed responsive to an operator removing an active key from an ignition slot. In another example, the key-off event may be confirmed responsive to removal of a passive key from a vehicle cabin, such as may occur when an operator leaves the vehicle. In still further examples, the key-off event may be confirmed responsive to actuation of an engine ignition start/stop button to a stop position, or remote actuation of a stop button via a key-fob, smart phone, tablet, or other device communicatively coupled to a vehicle controller.

If a key-off event is not confirmed, at 504, the method includes continuing engine combustion. That is, fuel and spark delivery may be maintained to engine cylinders. If a key-off event is confirmed, at 506, the method includes shutting down the engine by disabling fuel and spark delivery to engine cylinders. In addition, the engine controller (or powertrain control module, PCM) may be transitioned to a sleep mode. In the sleep mode, only an alarm clock chip or module of the engine controller/control module may be alive. A timer may be started upon transitioning the PCM to the sleep mode.

At 508, the method includes confirming if a defined duration has elapsed since the last key-off event. For example, it may be determined via the timer if the PCM has been in the sleep mode for at least enough time to cool down the engine. If the defined duration has not elapsed, then at 510, the PCM is not woken up, but maintained in the sleep mode. If the defined duration has elapsed, then at 512, the PCM is transitioned from the sleep mode to a wake-up mode. Transitioning to the wake-up mode includes maintaining a comparator and timer circuit awake following the key-off event. Upon waking up, if the engine has cooled down sufficiently (such as when the absolute difference between the engine coolant temperature and the ambient air temperature is at least 10 degrees Celsius), the diagnostic may proceed. Else, if the engine has not cooled down sufficiently, the engine PCM is returned to the sleep mode and a new wake-up time is set.

At 514, the method includes determining if cylinder valve actuator diagnostics are desired. In one example, cylinder valve actuator diagnostics may be desired if a threshold duration or distance of vehicle travel has elapsed since a last iteration of the diagnostics. In another example, cylinder valve actuator diagnostics may be desired if cylinder valves have been deactivated more than a threshold amount of times during the last drive cycle (which is the drive cycle immediately preceding the current engine key-off event). In yet another example, cylinder valve actuator diagnostics may be desired if the engine performance was sluggish during the last drive cycle. In still further examples, cylinder valve diagnostics may be performed every time the opportunity arises. If method 500 judges that cylinder valve actuator diagnostics are desired, the answer is yes and method 500 proceeds to 518. Otherwise, the answer is no and method 500 proceeds to 516.

At 516, responsive to diagnostics not being desired, the method includes maintaining the engine shutdown and returning the PCM to the sleep mode. Else, at 518, responsive to diagnostics being desired, the method includes selecting a VDE diagnostic routine. Specifically, it may be determined whether the cylinder valve actuators are to be diagnosed using reverse engine rotation or reverse e-booster rotation. In one example, the selection is based on operating conditions such as ambient pressure and a state of charge or voltage of a system battery that will be used to rotate the engine or the compressor in the reverse direction. The selection may account for the diagnostic results needing to be compensated for barometric pressure as it takes longer to pressurize the intake manifold at altitude. This causes the time constant to reach the pressure threshold become longer. In still another examples, the selection may be based on predicted or modeled air flow through the engine with intake and exhaust cams positioned at their base positions (e.g., positions where the intake and exhaust cams are pinned and prohibited from moving relative to crankshaft position).

It will be appreciated that in further examples, as elaborated below, the diagnostics may be performed in a pre-defined order including the engine reverse rotation based diagnostic being performed before the compressor reverse rotation based diagnostic (as shown by the dashed arrow leading from 514 to 524). By performing the diagnostic routine during conditions when the engine is shut-down, cylinder valve actuator diagnostics can be performed when the signal to noise ratio for the intake manifold sensors is improved. Specifically, since the diagnostics described herein use MAP (or MAF) sensed after a key-off event, the interfering effect of poor combustion, spark plug degradation, fuel injector degradation, exhaust gas oxygen sensor degradation, misfires, and rough idle is removed.

From 518, the method moves to 520 to determine if the engine reverse rotation-based diagnostic has been selected. If yes, the method moves to 524. Else, the method moves to 522 to determine if the e-booster reverse rotation-based diagnostic has been selected. If yes, then the method moves to 601 in FIG. 6.

At 524, the method includes spinning the engine in reverse, unfueled, with all cylinder valves active to establish a baseline airflow profile. For example, while not supplying spark or fuel to engine cylinders, and while not commanding any engine cylinder valve to be deactivated, the controller may rotate the engine in a direction that is reversed from the direction of engine rotation when the engine is combusting fuel and providing engine torque to propel the vehicle. The reverse engine spinning may be provided via coupling the engine to an electric H-bridge circuit, such as the circuit of FIG. 7. As elaborated at FIG. 7, the H-bridge may be used to reverse polarize a voltage supplied to an electric machine coupled to the engine crankshaft to spin the engine in reverse. Alternatively, a reversing circuit may be used to spin the engine in the reverse direction.

In one example, the engine may be rotated in the reverse direction via a starter or an integrated starter/generator. Alternatively, where the engine is coupled in a hybrid vehicle, the engine may be rotated in the reverse direction via an electric machine, such as an electric motor powered via a system battery. The engine is rotated at a predetermined speed with the engine throttle commanded to a fully open position. The engine speed provided via the reverse rotation may be lower than an engine cranking speed. Further, the engine speed may be low enough to flow air through all the engine cylinders to establish the baseline air flow. In one example, the PCM wakes up and activates the motor to spin the unfueled engine at 500 RPM for 15 seconds. By opening the throttle, effects of intake manifold filling may be reduced so that engine air flow may be more consistent. The controller may learn the baseline airflow level reached during the engine reverse rotation with all cylinder valves active. The reverse rotation enables the engine controller to leverage an existing intake manifold MAP sensor for sensing airflow received via the exhaust and intake valve of the cylinder.

Also at 524, the controller may learn a time taken to reach the baseline airflow level via the reverse rotation in the non-VDE mode. For example, the controller may measure an air meter output, such as from a MAP sensor or MAF sensor, while the engine is spun in reverse. The air meter outputs a voltage or current that is converted into an engine air flow amount. The response is learned as a time constant that the engine takes for the pressure inside the intake manifold to reach a steady-state level at the prevailing engine (reverse) speed.

At 526, method 500 includes deactivating one or more cylinders by commanding corresponding cylinder valves closed. This includes, for example at 528, deactivating a group of cylinders en masse, such as half of a total number of cylinders when shifting from a V8 mode to a V4 mode. Transitioning to the VDE mode en masse may include selectively deactivating all cylinders on one engine bank, selectively deactivating a common number of cylinders on each engine bank, asymmetrically deactivating half the total number of cylinders between the engine banks, etc. As another example, deactivating one or more cylinder valves includes, for example at 530, deactivating cylinders independently in a rolling pattern wherein the identity of deactivated cylinders may change from combustion event to combustion event. Transitioning to the VDE mode in a rolling pattern may include independently deactivating valve mechanisms for selected cylinders in accordance with a defined pattern so as to provide a specified induction state. For example, if the induction state desired is 0.5, wherein half of the total number of cylinders are deactivated, the controller may selectively deactivate half the total number of cylinders according to a defined pattern.

In both the rolling VDE and en masse VDE case, deactivating cylinder valves includes commanding cylinder valve actuation mechanisms closed so as to hold the corresponding cylinder(s) in a sealed state. In one example, based on the identity of the cylinders to deactivate, the controller may send a command signal to the corresponding cylinder valve actuation mechanisms to move them to a closed position. The cylinder valve actuator diagnostics are performed while all engine cylinder valves are commanded to close during an engine cycle.

At 532, the method includes spinning the engine in reverse, unfueled, with the engine in the VDE mode. For example, the controller does not supply spark and fuel to engine cylinders and rotates the engine in a reverse direction. The engine may be rotated via the electric machine which may be a starter, an integrated starter/generator, or an electric motor coupled to a driveline of a hybrid vehicle. Herein the reverse direction (or backward direction) is a direction of rotation that is reversed from the direction of engine rotation when engine cylinders are combusting fuel. The engine is rotated at a predetermined speed and the engine throttle is fully opened. In one example, the engine is rotated in reverse at a speed that is lower than an engine cranking speed, such as at 300 RPM. As such, the engine is rotated at the same speed with the cylinders valves deactivated as it was spun earlier at 524 to establish a baseline airflow with all cylinders active. By opening the throttle while rotating the engine in reverse, effects of intake manifold filling may be reduced so that engine air flow may be more consistent. The controller may learn a time taken by the engine to reach a target airflow level while the engine is rotating in reverse and while cylinder valves are commanded closed. For example, the controller may measure a MAP sensor (or MAF sensor) response while the engine is spun in reverse. In one example, the target air flow level is the baseline air flow level established with reverse engine rotation while all cylinders were active (at 524). In addition, the controller may learn a time taken to reach the baseline airflow level via the reverse rotation while in the VDE mode. For example, the measured MAP response may be learned as a time constant that the engine takes for the pressure inside the intake manifold to reach the steady-state level at the prevailing engine (reverse) speed with selected cylinder valves commanded closed. In the case of a rolling VDE configuration, where each cylinder is individually deactivated and one cylinder is diagnosed at a time, a family of curves having increasing time constants may be generated, each curve and the corresponding time constant generated each time a cylinder is deactivated.

The inventors herein have recognized that with the selected (e.g., half of the total set) cylinders deactivated and not performing work to charge the intake manifold, the time (and therefore the time constant) it takes to reach a steady state (or target) pressure level becomes longer. This provides an indication that the VDE locking mechanism including the cylinder valve deactivation mechanism is functioning as expected. In the case of the family of time constant curves, a gap in the family may occur due to the shifting of the time constant of one cylinder towards the time constant of another cylinder in the rolling VDE pattern.

Thus, at 534, the method includes comparing the time taken to reach the target pressure in the VDE mode relative to a threshold, the threshold based on the time taken to reach the target pressure while in the non-VDE mode. For example, it may be determined if the time taken to reach the target pressure with cylinder valves deactivated is higher than the threshold time taken to reach the target pressure with all cylinders active. An example MAP profile wherein the time constant in the VDE mode is compared to the time constant in the non-VDE mode is shown at FIG. 8. Alternatively, a family of curves generated during the VDE mode may be compared to a family of curves retrieved from the controller's memory and generated during engine testing. An example MAP profile wherein a family of time constant curves in the VDE mode is compared to a family of time constant curves in the non-VDE mode is shown at FIG. 9.

If the time taken is longer (such as when the time taken exceeds the threshold time by more than a threshold amount), or if all the curves in the generated family of curves is in the same place as the reference family of curves, then at 540, the method includes inferring that that the engine is in the VDE mode, as commanded, thereby indicating that the valve deactivation mechanism is not degraded.

If the time taken to achieve the baseline airflow or target pressure is the same with the cylinders commanded active or deactivated (that is, when the time taken in the VDE mode does not exceed the threshold time), or if at least one curve in the generated family of curves is misplaced, then at 536, the method includes inferring that that the engine is not in the VDE mode, indicating that the valve deactivation mechanism is degraded. For example, it may be indicated that the valve deactivation mechanism of the specific cylinder(s) whose valves were commanded closed are actually open. In this way, if the time constant to achieve the target pressure is the same with VDE enabled and disabled, it may be inferred that the VDE hardware locking mechanism (herein the valve deactivation mechanism) is degraded. For example, it may be inferred that the exhaust valve is stuck open (such as due to soot) causing air to leak in faster than it is expected to. As such, the method can also be used to measure partial function of the valve actuator mechanism, such as a leaky exhaust valve. Engine cylinder valve actuator degradation may be indicated by setting a diagnostic code, illuminating a light, or notifying a vehicle occupant via an information center.

Figure 6:
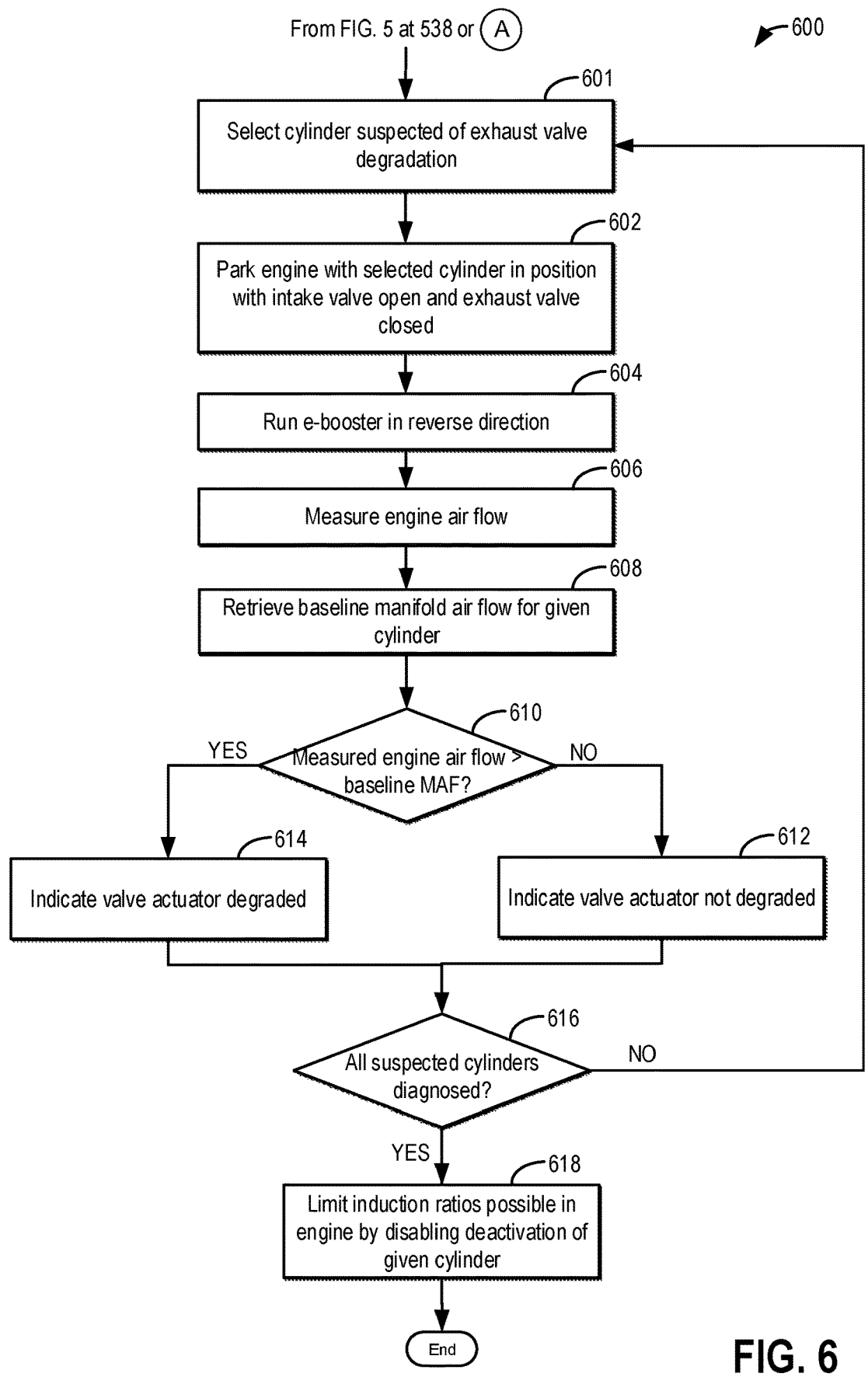

Then at 538, the method moves to confirm the identity of the degraded cylinder by performing the e-booster reverse rotation diagnostic elaborated at FIG. 6. Specifically, method 600 of FIG. 6 enables a targeted diagnosis of the exhaust valve actuator mechanism of the suspected cylinders. As an example, a V8 engine may be operated in a V4 mode by commanding valve actuators for 4 of the engine's 8 cylinders to be deactivated. Responsive to the reverse engine rotation based diagnostic routine, it may be learned that at least one of the commanded 4 cylinder valve actuators is degraded. Typically, exhaust valves are more likely to leak than intake valves due carbon build-up thereon. Therefore, the controller may perform the compressor reverse rotation based diagnostic routine wherein the suspected 4 cylinders are independently and sequentially deactivated to identify which of the 4 suspected cylinder exhaust valve actuators is degraded.

Optionally, responsive to the indication of degradation, the controller may adjust subsequent engine operation by limiting possible engine induction ratios (or preventing one or more cylinder deactivation cylinder modes). For example, a V8 engine may not be allowed to enter a V4 mode, thereby disabling a 0.5 induction ratio. As another example, rolling VDE patterns including selected cylinders may be disabled. By preventing the engine from entering a cylinder mode, the possibility of engine emissions degradation may be reduced. Further, wear of valve train components may be reduced. Method 500 proceeds to exit.

In this way, an existing engine sensor can be repurposed for use during VDE diagnostics. In particular, an intake manifold MAP sensor that is used during fueled engine rotation in a forward direction to estimate MAP for fuel control purposes can be repurposed for diagnosing a cylinder valve actuator during unfueled engine rotation in a backward direction.

It will be appreciated that while the method of FIG. 5 suggests performing the compressor reverse rotation based diagnostic (of FIG. 6) if that diagnostic is selected (at 522) or upon indication of VDE degradation via the engine reverse rotation based diagnostic (at 538), it will be appreciated that in alternate embodiments of method 500, the controller may perform the engine reverse rotation based diagnostic by default (as shown by the dashed arrow at 514), and optionally perform the compressor reverse rotation based diagnostic.

Turning now to FIG. 6, an example method 600 for diagnosing cylinder valve deactivation mechanisms for an engine is shown. The method of FIG. 6 may be performed as part of the method of FIG. 5, such as at 538 or following 522. The operating sequence of FIG. 6 may be produced via the system of FIGS. 1 and 2, and may be applied for engine configurations of FIGS. 4A and 4B. At least portions of the method of FIG. 6 may be incorporated as executable instructions stored in non-transitory memory while other portions of the method may be performed via a controller transforming operating states of devices and actuators in the physical world. Depending on the modality of the symptoms that trigger the execution of method 600 (such as based on whether single or multiple cylinders were identified as degraded in method 500 and their degradation is to be confirmed by the execution of method 600), the method enables a targeted diagnostic of a degraded exhaust valve in a suspected cylinder after a key-off event.

It will be appreciated that while method 600 is shown connected to method 500, this is not meant to be limiting. In still further examples, method 600 may be executed independent of method 500 after a key-off event responsive to an indication of abnormal or sluggish engine behavior during a drive cycle preceding the key-off event. Other precursory diagnostics that can pinpoint a potentially sluggish cylinder (such as a power balance test) can act as a trigger for the execution of the targeted cylinder exhaust valve diagnostic of FIG. 6 following a key-off event. The power balance test uses the crankshaft position sensor as input. It computes the acceleration of each cylinder's power stroke and performs a cylinder to cylinder comparison to determine which cylinder is not producing sufficient power during combustion. As there are many factors that can dilute a cylinder's ability to produce power, the balance test deterministically rationalizes the VDE to rule it out as a possible culprit.

At 601, the method includes selecting a cylinder suspected of exhaust valve degradation. Herein the selected cylinder is the cylinder that is targeted for exhaust valve diagnostics. In one example, where the cylinder valve actuators were previously diagnosed using reverse engine rotation with cylinders deactivated en masse (en masse VDE), the selected cylinder may be one of the cylinders that was deactivated en masse and wherein a measured time constant was less than a threshold. In another example, where the cylinder valve actuators were previously diagnosed using reverse engine rotation with cylinders individually and sequentially deactivated (rolling VDE), the selected cylinder may be a cylinder selected based on a misplaced time constant curve.

At 602, the method includes parking the engine, with fuel and spark disabled, and with the selected cylinder in a position where the cylinder's intake valve is open and exhaust valve is purportedly closed. The controller may rotate the engine slowly, and unfueled, to a position where the selected cylinder is parked with the intake valve open and exhaust valve closed. The engine may be rotated via an electric machine. In one example, the engine may be rotated via a starter or an integrated starter/generator. In another example, where the engine is coupled in a hybrid vehicle, the engine is rotated via an electric motor coupled to a driveline of the hybrid vehicle. The engine may be rotated in a forward or a reverse direction. As one example, the controller does not supply spark and fuel to engine cylinders and rotates the engine in the same direction as a direction of engine rotation when engine cylinders are combusting fuel. The engine is rotated at a predetermined speed and the engine throttle is fully opened. In one example, the engine is rotated to park the selected cylinder in the defined position at a speed that is significantly lower than an engine cranking speed, such as at 50 RPM, until the cylinder is in a position where the intake valve of the cylinder is open and the exhaust valve of the cylinder is closed. The position may include a position within an intake stroke of the selected cylinder, such as at or shortly after intake stroke TDC.

At 604, the method includes spinning an electric compressor (herein also referred to as an e-booster) in a reverse direction. The electric compressor may be an electric supercharger compressor, such as compressor 110 of FIG. 1, coupled in a bypass parallel to an intake passage. Spinning the e-booster includes opening a bypass valve coupling the intake passage to the bypass housing the electric compressor. In still other examples, the e-booster may be an electric turbocharger compressor. While spinning the e-booster backwards, an intake throttle of the engine may be held open (e.g., fully open).

The electric compressor may be driven by an electric motor such that spinning the e-booster in the reverse direction includes actuating and operating the electric motor. As such, the electric motor may also be used during other conditions to enable and accelerate the compressor in a forward direction. The electric motor may be electrically coupled to an H-bridge, such as the H-bridge of FIG. 7, to drive the compressor in the reverse direction. As elaborated at FIG. 7, the H-bridge may be used to reverse polarize a voltage supplied to the electric motor of the e-booster to spin the compressor in reverse. Alternatively, a reversing circuit may be used to actuate the motor in the forward or the reverse directions. The compressor may be spun in reverse for a duration to establish a steady-state air flow in the intake manifold. As discussed below, the compressor may be spun in the reverse direction at a speed and for a duration that was previously used to establish a baseline air flow for each engine cylinder. For example, the compressor may be spun in reverse at a speed of 20,000 RPM for 20 seconds).

By spinning the e-booster, the compressor rotation is used to provide motive force to flow air through an intake manifold air flow meter with the engine parked in a static condition. This is essentially the opposite of the approach used in the engine rotation based diagnostic of FIG. 5 wherein engine rotation is used to move air through engine cylinders.

At 606, the method includes measuring air flow through the engine via an engine air flow meter. Specifically, the controller measures an air flow into the intake manifold via a metering device, such as via a MAF or MAP sensor. The air meter outputs a voltage or current that is converted into an engine air flow amount. At 608, the method includes retrieving a baseline manifold airflow for the given cylinder from the controller's memory. The baseline air flow values may be stored in a look-up table and indexed by cylinder number. The baseline airflow for each engine cylinder may have been generated during engine testing, or shortly after vehicle manufacture, with the engine shutdown. Therein, the controller may sequentially position each cylinder at a corresponding intake stroke TDC (with the intake valve open and the exhaust valve closed) and run the e-booster in reverse with the intake throttle open for a duration to establish the baseline airflow for the given cylinder. As an example, the baseline air flow for each cylinder may be learned by spinning the compressor in reverse at a speed of 20,000 RPM for 20 seconds.

At 610, the measured engine air flow is compared to the baseline air flow. Specifically, it is determined if the measured intake manifold air flow is higher than the baseline air flow (or if the measured air flow exceeds the baseline air flow by more than a threshold amount). If not, then at 612, it is indicated that the diagnosed cylinder valve is not degraded. If the measured engine air flow is higher than the baseline air flow, then at 614, the method includes confirming that the diagnosed cylinder exhaust valve is degraded. Herein the higher than baseline flow with the e-booster spinning in reverse is indicative of the presence of additional air flow coming from a leaking exhaust valve. Thus it may be indicated that the given cylinder's exhaust valve is stuck open or leaking due to soot deposition. If the suspected cylinder's exhaust valve was sealed, there could be slight air flow from other cylinders being position in a positive valve overlap region (where both the intake and the exhaust valves are open), or from other cylinders being in their compression or power strokes. However, by selecting a position that is at or after intake stroke TDC, these interfering effects may be reduced and the reliability of the diagnostic may be improved. An example air flow profile representing exhaust valve degradation is shown with reference to FIG. 10.

From each of 614 and 612, the method moves to 616 to determine if all the suspected cylinders have been diagnosed. If not, then the method returns to 601 to select another cylinder for performing targeted exhaust valve diagnostics, and then the diagnostic routine is reiterated. Else, if all suspected cylinders have been diagnosed, then at 618, the induction ratios possible in the engine may be limited by limiting deactivation in the cylinders wherein cylinder valve degradation is confirmed. For example, deactivation of the cylinders having degraded exhaust valves may be disabled, thereby preventing the engine from entering induction ratios and deactivation patterns involving the given cylinders.

It will be appreciated that while the method of FIGS. 5-6 are shown as being performed during a key-off event, in other examples, such as where the engine is coupled in a vehicle configured with autonomous capabilities, the methods may be performed when the autonomous vehicle has no customers in the vehicle cabin. Alternatively, the methods may be opportunistically performed when a customer is not present in the vehicle.

Turning now to FIG. 8, map 800 depicts an example cylinder valve actuator diagnostic that relies on reverse engine rotation, the diagnostic performed in an engine system that deactivates a group of cylinders en masse. Map 800 depicts an engine VDE mode (on or off) at plot 802, an engine rotation direction is depicted at plot 804, and engine cranking (yes or no) is shown at plot 806. A first MAP profile, generated via an intake MAP sensor, for a scenario where a cylinder valve actuator mechanism is not degraded is shown at plot 808. A second MAP profile, generated via the intake MAP sensor, for a scenario where the cylinder valve actuator mechanism is degraded is shown at plot 810. All plots are depicted over time along the x-axis.

Prior to t1, the engine is operated with all cylinders active (engine in non-VDE mode) and the engine spinning in a forward direction. As a result, the MAP is elevated. At t1, the engine is shut-down responsive to a key-off event, resulting in a drop in MAP. At t2, a VDE diagnostic is initiated. For example, in the non-VDE mode, the engine takes a duration from t2 to t3 to reach pressure 807, and a time constant of 1 is determined as a duration taken for 67% of the target pressure to be reached. At t3, engine spinning is stopped, and MAP drops. At t4, the engine is transitioned to a VDE mode by deactivating half of all the cylinders en masse. Also, engine reverse rotation is started with the engine spun at the same speed as during the non-VDE mode. As a result of the engine rotation, there is a gradual rise in MAP until MAP reaches a steady-state pressure (dashed line) 807. A time taken for MAP to reach 807 with the reverse engine spinning is noted and a corresponding time constant is determined.

When the cylinder valve deactivation mechanism is not degraded, as shown at plot 808, the engine takes a duration from t4 to t6 to reach pressure 807 while in the VDE mode. This is longer than the time taken between t2 and t3 in the non-VDE mode. Consequently, the MAP profile in the VDE mode has a larger time constant (which in this example has a value of 2). In comparison, when the cylinder valve deactivation mechanism is degraded, as shown at plot 810, the engine takes a duration from t4 to t5 to reach pressure 807 when in the VDE mode, which is substantially the same as the time taken between t2 and t3 in the non-VDE mode. Consequently, the MAP profile in the VDE mode also has a time constant of 1.

Turning now to FIG. 9, map 900 depicts another example cylinder valve actuator diagnostic that relies on reverse engine rotation. Map 900 depicts example MAP profiles generated during a cylinder valve actuator diagnostic for an engine system that deactivates cylinders independently in a rolling fashion. Therein, map 910 depicts a first family of time curve constants generated when operating an engine in a VDE mode with all cylinder valve actuation mechanisms functional. Maps 920 and 940 depict a second and a third family of time curve constants, respectively, generated when operating the engine in the VDE mode with a valve actuation mechanism of one cylinder degraded. All plots are depicted over time along the x-axis. All the depicted examples are generated in a V6 engine wherein first Cylinder 1 is deactivated, then cylinder 3 is deactivated, and then cylinder 5 is deactivated. Specifically, the indicated cylinder is individually deactivated by commanding the corresponding cylinder valves closed while commanding valves for remaining engine cylinders open. The MAP profile is generated while spinning an engine in reverse, based on the output of an intake MAP sensor.

First profile 910 shows a first family of curves including MAP curves 902-908. First MAP curve 902 with a time constant TC1 is generated with all cylinders active. A second MAP curve 904 with a time constant TC2 is generated when a first cylinder, Cylinder 1, is selectively deactivated. A third MAP curve 906 with a time constant TC3 is generated when a second cylinder, Cylinder 3, is selectively deactivated. A fourth MAP curve 908 with a time constant TC4 is generated when a third cylinder, Cylinder 5, is selectively deactivated. As shown, when all cylinder valve mechanisms are functional, deactivating one cylinder at a time produces pressurization, and generates a family of curves with increasing time constants.

Second profile 920 depicts an example of what happens to MAP curves 902-908 responsive to cylinder valve mechanism degradation. Second profile 920 depicts a scenario where Cylinder 3 is stuck open when commanded closed. This causes the third MAP curve 906 to mimic the second MAP curve 904. In other words, Cylinder 3 mimics Cylinder 1. All other curves remain the same as in the first profile 910.

Third profile 940 depicts another example of what happens to MAP curves 902-908 responsive to cylinder valve mechanism degradation. Third profile 940 depicts a scenario where Cylinder 3 is stuck closed. This causes the third MAP curve 906 to mimic the fourth MAP curve 906. In other words, Cylinder 3 mimics Cylinder 5. All other curves remain the same as in the first profile 910.

Turning now to FIG. 10, map 1000 depicts an example cylinder valve actuator diagnostic that relies on reverse electric booster rotation, and is based on measured changes in engine air flow. Map 1000 depicts an engine VDE mode (on or off) at plot 1002, an e-booster rotation direction is depicted at plot 1004. An engine air flow (MAF) profile, generated via an intake MAF sensor, for a scenario where a cylinder valve actuator mechanism is not degraded is shown at plot 1006, and is compared to a profile for a scenario where a cylinder valve actuator mechanism is degraded, which is shown at plot 1008. All plots are depicted over time along the x-axis.

Prior to t1, the engine is operated with all cylinders active (engine in non-VDE mode) and the compressor spinning in a forward direction to enable boosted engine operation. As a result, the MAF is elevated. At t1, the engine is shut-down responsive to a key-off event, resulting in a drop in MAF. At t2, a VDE diagnostic is initiated. Therein, with fuel and spark disabled, the engine is parked in a position with a selected cylinder at intake stroke TDC. Consequently, the engine is in the VDE mode with the selected cylinder in a position where the intake valve is open and the exhaust valve is closed. The e-booster is then rotated in reverse with the exhaust valve of the cylinder purportedly closed. As a result, there is a gradual rise in MAF until MAF reaches a steady-state level. When the cylinder's exhaust valve is functional (that is, it is closed when expected to be closed), the MAF level rises to a first steady-state level MAF1, as shown at plot 1006 (solid line). However, when the cylinder's exhaust valve is degraded (that is, it is at least partly open and leaking exhaust gas when expected to be closed), the MAF level rises to a second steady-state level MAF2, higher than MAF1, as shown at plot 1008 (dashed line).

Turning now to FIG. 11, map 1100 depicts an example timeline for performing engine cylinder valve actuator diagnostics including diagnostics that rely on reverse engine rotation and then reverse electric booster rotation, and is based on measured changes in engine air flow. Map 1100 depicts engine speed at plot 1102, an engine VDE mode (enabled or disabled) at plot 1104, an engine rotation direction at plot 1106, an e-booster rotation direction at plot 1108, sensed MAP at plot 1110, and a flag indicating valve actuator degradation at plot 1112. All plots are depicted over time along the x-axis.

Prior to t1, the engine is operated with all cylinders active and VDE mode disabled (plot 1104). The engine speed (plot 1102) is elevated with the engine spinning in a forward direction (plot 1106) due to fuel being combusted inside engine cylinders. Boosted engine operation is enabled via the e-booster also spinning in a forward direction (plot 1108). As a result, MAP (plot 1110) is elevated. At this time, no valve degradation is diagnosed and the flag (plot 1112) is not set.

At t1, the engine is shut-down responsive to a key-off event, resulting in a drop in MAP. Engine and e-booster rotation is discontinued. At t2, after a duration since the key-off event has elapsed, an engine controller is woken up and a first VDE diagnostic is initiated. Therein, with fuel and spark disabled, the engine is cranked in reverse with all cylinder valves operating in the non-VDE mode. As a result, there is a gradual rise in MAP until MAP reaches a steady-state pressure (dashed line) 1112. Based on the time taken for MAP to reach 1112 (a first duration from t2 to t3) with the reverse engine spinning, a first time constant is determined for the MAP profile.

At t3, engine spinning is stopped, and MAP drops. At t4, the engine is transitioned to a VDE mode by deactivating half of all the cylinders en masse. Also at t4, engine reverse rotation is started with the engine spun at the same speed as during the non-VDE mode. As a result of the engine rotation, there is a gradual rise in MAP until MAP reaches the steady-state pressure 1112. The time taken for MAP to reach 1112 (a second duration from t4 to t5) with the reverse engine spinning is determined to be substantially the same as the time taken in the VDE mode (the first duration from t2 to t3). Responsive to the time constant for the MAP profile in the VDE mode being the same as the first time constant in the non-VDE mode, cylinder valve actuator degradation is determined and the flag is set at t6.

In the depicted example, the engine is a V8 engine and the VDE mode is enabled by selectively deactivating 4 cylinders. Thus, it is inferred that the cylinder valve actuator degradation corresponds to at least one of the deactivated 4 cylinders. One of the 4 cylinders is therefore suspected of exhaust valve degradation. To confirm the identity of the degraded cylinder, shortly after t6, another VDE diagnostic that relies on reverse compressor rotation is initiated.

Between t6 and t7, the engine is rotated slowly, in the forward direction, and then stopped in a position with a first of the suspected cylinders parked at intake stroke TDC. Consequently, the selected cylinder is in a position where the intake valve is open and the exhaust valve is purportedly closed. The e-booster is then rotated in the reverse direction. As a result, there is a gradual rise in MAP (indicative of MAP) until MAP reaches a steady-state level. The steady-state MAP level reached, however, is higher than a reference steady-state level 1114 (dashed line), the reference level for a cylinder with functional exhaust valves. Therefore it is confirmed that the first cylinder has a degraded exhaust valve actuator. At t8, the engine is restarted, and spun in the forward direction. After t8, deactivation of the identified cylinder with the degraded exhaust valve is disabled.

In this way, the engine may be operated in a first diagnostic mode including rotating an engine, unfueled, in a direction reversed from fueled engine rotation and indicating cylinder valve actuator degradation based on a measured rate of change of intake manifold pressure. At a different time, the engine may be operated in a second diagnostic mode including rotating an intake compressor in a direction reversed from boosted engine operation, while holding an engine in a fixed position, and indicating cylinder valve actuator degradation based on a steady-state intake manifold air flow level. The engine may operate in either of the first and the second diagnostic mode following a key-off event with an engine controller awakened from sleep. Indicating in the first diagnostic mode may include indicating valve actuator degradation responsive to a first intake manifold pressure change rate, sensed without deactivating valves of a plurality of engine cylinders, being within a threshold of a second intake manifold pressure change rate sensed while deactivating valves of at least one of the plurality of engine cylinders. In comparison, the indicating in the second diagnostic mode may include indicating valve actuator degradation responsive to the steady-state intake manifold air flow level during the rotating while deactivating valves of one of the plurality of cylinders being higher than a threshold level, the threshold level learned during engine testing while deactivating valves of the one of the plurality of cylinders and while the deactivated valves are functional. The controller may hold the engine in a fixed position while operating in the second diagnostic mode by parking the engine in an intake stroke top dead center of the one of the plurality of cylinders with an intake valve open and an exhaust valve purportedly closed. Additionally or optionally, during each of the first and second diagnostic mode, each of the engine and the compressor may be rotated in the reverse direction via an electric machine, the engine or the compressor rotated in the reverse direction by actuating a reversing circuit coupled to the electric machine to a setting where a voltage supplied to the electric machine is reverse polarized.

As illustrated by examples herein, the method of operating in the first diagnostic mode (with reverse engine rotation) may be performed responsive to a determination of a first condition (e.g., while at a lower altitude, or with lower battery voltage availability) being present (such as based on sensor output, e.g., by determining barometric pressure or sensing battery state of charge). Likewise, if the first condition is not confirmed but a second condition is confirmed (e.g., while at a higher altitude, or with higher battery voltage availability), the second diagnostic mode (with compressor reverse rotation) may be performed.

In this way, cylinder valve actuators of a VDE engine can be reliably diagnosed. By using existing engine system sensors, VDE diagnostics are performed without additional costly sensors, such an in-cylinder pressure sensors. By performing the diagnostics after a key-off event, a signal to noise ratio of the sensors is improved by reducing interfering engine noise from poor combustion, and degraded fuel injectors or spark plugs. In addition, the need to wait for VDE operation to diagnose the valve actuators is obviated. This allows VDE mechanisms to be frequently diagnosed even if a vehicle was operating with high load or intermittent stops and starts on a given drive cycle. The technical effect of diagnosing cylinder valve mechanism based on metered intake manifold air flow while spinning an engine in reverse is that the longer duration on exhaust valve opening can be leveraged to achieve a desired manifold pressurization by rotating the engine at a lower speed. The lower engine speed reduces power consumption from a battery, improving fuel economy. In addition, the lower engine speed reduces interfering engine noise, further improving the signal to noise ratio. The technical effect of diagnosing cylinder valve mechanism based on metered intake manifold air flow while spinning an electric booster in reverse is that a sluggish cylinder can be pinpointed, expediting troubleshooting of engine performance issues. By timely diagnosing VDE mechanisms, mitigating actions may also be performed in a timely manner, improving engine performance and exhaust emissions.

An example engine method comprises: rotating an engine, unfueled, in a direction reversed from fueled engine rotation; and indicating valve actuator degradation responsive to an intake manifold pressure change rate, sensed without deactivating valves of a plurality of engine cylinders, being less than a threshold different from another intake manifold pressure change rate sensed while deactivating valves of at least one of the plurality of engine cylinders. In the preceding example, additionally or optionally, the engine is rotated unfueled after a threshold duration has elapsed since a key-off event, the method further comprising waking an engine controller after the threshold duration to maintain a comparator circuit awake. In any or all of the preceding examples, additionally or optionally, the method further comprises adjusting engine operation during a key-on event following the key-off event responsive to the indicating, the adjusting including disabling deactivation of one of more of the plurality of engine cylinders with degraded valve actuators. In any or all of the preceding examples, additionally or optionally, the method further comprises, responsive to the indicating, confirming an identity of one or more of the plurality of engine cylinders with degraded valve actuators by rotating an electric compressor in a direction reversed from compressor rotation during boosted engine operation, while holding the engine static. In any or all of the preceding examples, additionally or optionally, reverse rotating the compressor while holding the engine static includes parking one of the plurality of engine cylinders with degraded valve actuators parked in a position with an intake valve open and an exhaust valve closed. In any or all of the preceding examples, additionally or optionally, the confirming includes indicating exhaust valve soot accumulation in the parked cylinder responsive to measured intake manifold air flow during the reverse rotating the compressor being higher than a threshold manifold air flow. In any or all of the preceding examples, additionally or optionally, each of the engine and the compressor is rotated in the reverse direction via an electric machine, wherein the rotating the engine or the compressor in the reversed direction includes actuating a reversing circuit coupled to the electric machine to a setting where a voltage supplied to the electric machine is reverse polarized. In any or all of the preceding examples, additionally or optionally, each of the intake manifold pressure change rate, the another intake manifold pressure change rate, and the intake manifold air flow is sensed via an intake manifold air meter, the air meter including one of a manifold pressure and air flow sensor. In any or all of the preceding examples, additionally or optionally, the intake manifold pressure change rate, sensed without deactivating valves of a plurality of engine cylinders, includes a first time constant for reaching a steady-state pressure level in an intake manifold while rotating the engine, and wherein the another intake manifold pressure change rate, sensed while deactivating valves of at least one of the plurality of engine cylinders, includes a second, different time constant for reaching the steady-state pressure level in the intake manifold while rotating the engine. In any or all of the preceding examples, additionally or optionally, deactivating valves of at least one of the plurality of engine cylinders includes one of deactivating valves for a group of cylinders of the plurality of engine cylinders in concert and independently deactivating valves for one of the plurality of cylinders at a time. In any or all of the preceding examples, additionally or optionally, deactivating valves of at least one of the plurality of engine cylinders includes holding valves in a closed state over two consecutive engine revolutions.

Another example engine operating method comprises: operating in a first diagnostic mode including rotating an engine, unfueled, in a direction reversed from fueled engine rotation and indicating cylinder valve actuator degradation based on a measured rate of change of intake manifold pressure; and operating in a second diagnostic mode including rotating an intake compressor in a direction reversed from boosted engine operation, while holding an engine in a fixed position, and indicating cylinder valve actuator degradation based on a steady-state intake manifold air flow level. In any or all of the preceding examples, additionally or optionally, the method further comprises operating in each of the first and the second diagnostic mode following a key-off event with an engine controller awakened from sleep. In any or all of the preceding examples, additionally or optionally, the indicating in the first diagnostic mode includes indicating valve actuator degradation responsive to a first intake manifold pressure change rate, sensed without deactivating valves of a plurality of engine cylinders, being within a threshold of a second intake manifold pressure change rate sensed while deactivating valves of at least one of the plurality of engine cylinders; and wherein the indicating in the second diagnostic mode includes indicating valve actuator degradation responsive to the steady-state intake manifold air flow level during the rotating while deactivating valves of one of the plurality of cylinders being higher than a threshold level, the threshold level learned during engine testing while deactivating valves of the one of the plurality of cylinders and while the deactivated valves are functional. In any or all of the preceding examples, additionally or optionally, holding the engine in a fixed position while operating in the second diagnostic mode includes parking the engine in an intake stroke top dead center of the one of the plurality of cylinders with an intake valve open and an exhaust valve purportedly closed. In any or all of the preceding examples, additionally or optionally, during each of the first and second diagnostic mode, each of the engine and the compressor are rotated in the reverse direction via an electric machine, the engine or the compressor rotated in the reverse direction by actuating a reversing circuit coupled to the electric machine to a setting where a voltage supplied to the electric machine is reverse polarized.

Another example engine system comprises: an engine including one or more cylinder valve deactivating mechanisms; an electric machine including one of a starter motor, an integrated starter/generator, and an electric motor; an H-bridge circuit coupled to the electric machine; an electric compressor coupled to an intake manifold of the engine, the electric compressor housed in a bypass; an intake manifold pressure sensor; a comparator circuit; and a controller including executable instructions stored in non-transitory memory to: following a key-off event, waking up the comparator circuit; while rotating the engine, unfueled via the electric machine, in a direction reversed from fueled engine rotation, comparing a first manifold pressure change rate without deactivating valves of a subset of all engine cylinders to a second manifold pressure change rate while deactivating valves of the subset; indicating valve actuator degradation for one cylinder of the subset responsive to a lower than threshold difference between the first manifold pressure change rate and the second manifold pressure change rate; and responsive to the indicating, identifying the one cylinder by rotating the compressor via the electric machine in a direction reversed from boosted engine rotation, while holding the engine in a position where the one cylinder is in an intake stroke top dead center, the identifying based on a steady-state manifold pressure during the rotating relative to a threshold pressure. In the preceding example, additionally or optionally, rotating the engine, unfueled via the electric machine, in the direction reversed from fueled engine rotation and by rotating the compressor via the electric machine in the direction reversed from boosted engine rotation includes actuating the H-bridge coupled to the electric machine to a setting where a voltage supplied to the electric machine is reverse polarized. In any or all of the preceding examples, additionally or optionally, the identifying includes indicating valve actuator degradation for the one cylinder responsive to the steady-state manifold pressure during the rotating exceeding the threshold pressure. In any or all of the preceding examples, additionally or optionally, deactivating valves of the subset of all engine cylinders comprises holding intake and exhaust valves for each cylinder of the subset in a closed state for at least two consecutive engine revolutions.

It will be appreciated that the configurations and methods disclosed herein are exemplary in nature, and that these specific examples are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An engine method, comprising:
rotating an engine, unfueled, in a direction reversed from fueled engine rotation; and indicating valve actuator degradation responsive to an intake manifold pressure change rate, sensed without deactivating valves of a plurality of engine cylinders, being less than a threshold different from another intake manifold pressure change rate sensed while deactivating valves of at least one of the plurality of engine cylinders.

2. The method of claim 1, wherein the engine is rotated unfueled after a threshold duration has elapsed since a key-off event, the method further comprising waking an engine controller after the threshold duration to maintain a comparator circuit awake.

3. The method of claim 2, further comprising, adjusting engine operation during a key-on event following the key-off event responsive to the indicating, the adjusting including disabling deactivation of one of more of the plurality of engine cylinders with degraded valve actuators.

4. The method of claim 2, further comprising, responsive to the indicating, confirming an identity of one or more of the plurality of engine cylinders with degraded valve actuators by rotating an electric compressor in a direction reversed from compressor rotation during boosted engine operation, while holding the engine static.

5. The method of claim 4, wherein reverse rotating the compressor while holding the engine static includes parking one of the plurality of engine cylinders with degraded valve actuators parked in a position with an intake valve open and an exhaust valve closed.

6. The method of claim 4, wherein the confirming includes indicating exhaust valve soot accumulation in the parked cylinder responsive to measured intake manifold air flow during the reverse rotating the compressor being higher than a threshold manifold air flow.

7. The method of claim 4, wherein each of the engine and the compressor is rotated in the reverse direction via an electric machine, wherein the rotating the engine or the compressor in the reversed direction includes actuating a reversing circuit coupled to the electric machine to a setting where a voltage supplied to the electric machine is reverse polarized.

8. The method of claim 1, wherein each of the intake manifold pressure change rate, the another intake manifold pressure change rate, and the intake manifold air flow is sensed via an intake manifold air meter, the air meter including one of a manifold pressure and air flow sensor.

9. The method of claim 1, wherein the intake manifold pressure change rate, sensed without deactivating valves of a plurality of engine cylinders, includes a first time constant for reaching a steady-state pressure level in an intake manifold while rotating the engine, and wherein the another intake manifold pressure change rate, sensed while deactivating valves of at least one of the plurality of engine cylinders, includes a second, different time constant for reaching the steady-state pressure level in the intake manifold while rotating the engine.

10. The method of claim 1, wherein deactivating valves of at least one of the plurality of engine cylinders includes one of deactivating valves for a group of cylinders of the plurality of engine cylinders in concert and independently deactivating valves for one of the plurality of cylinders at a time.

11. The method of claim 1, wherein deactivating valves of at least one of the plurality of engine cylinders includes holding valves in a closed state over two consecutive engine revolutions.

12. An engine operating method, comprising:
operating in a first diagnostic mode including rotating an engine, unfueled, in a direction reversed from fueled engine rotation and indicating cylinder valve actuator degradation based on a measured rate of change of intake manifold pressure; and
operating in a second diagnostic mode including rotating an intake compressor in a direction reversed from boosted engine operation, while holding an engine in a fixed position, and indicating cylinder valve actuator degradation based on a steady-state intake manifold air flow level.

13. The method of claim 12, further comprising, operating in each of the first and the second diagnostic mode following a key-off event with an engine controller awakened from sleep.

14. The method of claim 12, wherein the indicating in the first diagnostic mode includes indicating valve actuator degradation responsive to a first intake manifold pressure change rate, sensed without deactivating valves of a plurality of engine cylinders, being within a threshold of a second intake manifold pressure change rate sensed while deactivating valves of at least one of the plurality of engine cylinders; and wherein the indicating in the second diagnostic mode includes indicating valve actuator degradation responsive to the steady-state intake manifold air flow level during the rotating while deactivating valves of one of the plurality of cylinders being higher than a threshold level, the threshold level learned during engine testing while deactivating valves of the one of the plurality of cylinders and while the deactivated valves are functional.

15. The method of claim 12, wherein holding the engine in a fixed position while operating in the second diagnostic mode includes parking the engine in an intake stroke top dead center of the one of the plurality of cylinders with an intake valve open and an exhaust valve purportedly closed.

16. The method of claim 12, wherein during each of the first and second diagnostic mode, each of the engine and the compressor are rotated in the reverse direction via an electric machine, the engine or the compressor rotated in the reverse direction by actuating a reversing circuit coupled to the electric machine to a setting where a voltage supplied to the electric machine is reverse polarized.

17. An engine system, comprising:
an engine including one or more cylinder valve deactivating mechanisms;
an electric machine including one of a starter motor, an integrated starter/generator, and an electric motor;
an H-bridge circuit coupled to the electric machine;
an electric compressor coupled to an intake manifold of the engine, the electric compressor housed in a bypass;
an intake manifold pressure sensor;
a comparator circuit; and
a controller including executable instructions stored in non-transitory memory to:
following a key-off event,
waking up the comparator circuit;
while rotating the engine, unfueled via the electric machine, in a direction reversed from fueled engine rotation, comparing a first manifold pressure change rate without deactivating valves of a subset of all engine cylinders to a second manifold pressure change rate while deactivating valves of the subset;
indicating valve actuator degradation for one cylinder of the subset responsive to a lower than threshold difference between the first manifold pressure change rate and the second manifold pressure change rate; and
responsive to the indicating, identifying the one cylinder by rotating the compressor via the electric machine in a direction reversed from boosted engine rotation, while holding the engine in a position where the one cylinder is in an intake stroke top dead center, the identifying based on a steady-state manifold pressure during the rotating relative to a threshold pressure.

18. The system of claim 17, wherein rotating the engine, unfueled via the electric machine, in the direction reversed from fueled engine rotation and by rotating the compressor via the electric machine in the direction reversed from boosted engine rotation includes actuating the H-bridge coupled to the electric machine to a setting where a voltage supplied to the electric machine is reverse polarized.

19. The system of claim 17, wherein the identifying includes indicating valve actuator degradation for the one cylinder responsive to the steady-state manifold pressure during the rotating exceeding the threshold pressure.

20. The system of claim 17, where deactivating valves of the subset of all engine cylinders comprises holding intake and exhaust valves for each cylinder of the subset in a closed state for at least two consecutive engine revolutions.

* * * * *